United States Patent [19]
Castiel et al.

[11] Patent Number: 6,102,335
[45] Date of Patent: Aug. 15, 2000

[54] ELLIPTICAL ORBIT SATELLITE, SYSTEM, AND DEPLOYMENT WITH CONTROLLABLE COVERAGE CHARACTERISTICS

[75] Inventors: David Castiel; John Draim; Jay Brosius; Matthew Schor, all of Washington, D.C.

[73] Assignee: Mobile Communications Holdings, Inc., Washington, D.C.

[21] Appl. No.: 09/074,772

[22] Filed: May 8, 1998

Related U.S. Application Data

[63] Continuation-in-part of application No. 08/197,260, Feb. 16, 1994, Pat. No. 5,582,367, which is a continuation-in-part of application No. 07/892,239, Jun. 2, 1992, Pat. No. 5,931,417.

[51] Int. Cl.$^7$ ........................................................ B64G 1/00
[52] U.S. Cl. ........................................ 244/158 R; 455/430
[58] Field of Search ...................... 244/158 R; 455/12.1, 455/13.1; 342/356; 453/427–430

[56] References Cited

U.S. PATENT DOCUMENTS

| | | | |
|---|---|---|---|
| 3,340,531 | 9/1967 | Kefalas et al. | 244/158 R |
| 3,384,891 | 5/1968 | Anderson | 244/158 R |
| 5,439,190 | 8/1995 | Horstein et al. | 244/158 R |

*Primary Examiner*—Galen L. Barefoot
*Attorney, Agent, or Firm*—Fish & Richardson P.C.

[57] ABSTRACT

An elliptical orbit satellite system which describes communication and TT&C with ground stations. Earth stations are located for the circular orbiting satellite in a way such that the line of sight can never include geo synchronous satellites. The ground stations for the elliptically orbiting satellites monitor the position of the satellite, and no antenna communicates with a satellite which is in direct line of sight between the antenna and a geo satellite. Another aspect of the invention locates two TT&C stations, separated in longitude by 90° and configures these stations such that each satellite in each constellation will be able to communicate with one of the two TT&C stations once during each satellite rotation period.

7 Claims, 21 Drawing Sheets

ELLIPTICAL ORBIT SATELLITE, SYSTEM, AND DEPLOYMENT WITH CONTROLLABLE COVERAGE CHARACTERISTICS

This is a continuation-in-part of application Ser. No. 08/197,260 filed Feb. 16, 1994, U.S. Pat. No. 5,582,367, which is a continuation-in-part of application Ser. No. 07/892,239 filed Jun. 2, 1992, U.S. Pat. No. 5,931,417.

FIELD OF THE INVENTION

The present invention relates to elliptical satellite orbits, constellations, methods, and communication systems. The present invention also explores specific earth station placement optimized for these elliptical orbit constellations, however, it could also apply to other types of constellations including weather, surveillance, and the like.

BACKGROUND OF THE INVENTION

The concept of artificial satellites circling the earth was introduced to scientific literature by Sir Isaac Newton in 1686. Things have gotten considerably more complicated since that time, however. The basic concepts of an orbit are described in any orbital mechanics or astrodynamics textbook, such as "Fundamentals of Astrodynamics" by Bate et al. or "Orbital Mechanics" by Chobotov, AIAA Education Series, Publisher. The following definitions of these terms will be first provided here, since they are necessary for proper understanding of the present invention.

The earliest satellites placed into space by man were deployed into very low circular orbits. The resulting visibility footprint of one of these satellites was quite small and a single satellite had the added disadvantage of providing only a few minutes of coverage per day. In fact, it was quite common for an observer on the equator to miss being in contact with such a satellite for several days. Raising the satellite to a higher orbital altitude (e.g., ≈600 nautical miles) helped extend both the coverage footprint, average viewing elevation, and the time in view, but for some missions frequent or even continuous coverage became a requirement. This led to the deployment of early multiple satellite systems, a typical example being the Navy's Transit navigation satellite system. Satellite systems designers were increasingly asked to provide continuous coverage; first, for latitudinal zones and then, for the entire globe.

One of the first constellation designers to study zonal coverage was David Lüders. The Englishman, John Walker, was the first to systematize the design of multiple-ring, multiple satellites per ring, constellations and his work contributed greatly to the optimization of a number of multi-satellite systems (e.g., NAVSTAR GPS). A Russian designer, G. Mozhaev, independently came up with similar arrays using a more theoretical approach based on mathematical set and group theory. Polar constellations often employed the concept of "street-of-coverage", and further coverage improvements were made by Beste, Ballard and Rider. More recently, Hanson and Linden have investigated large arrays of low earth orbit "LEO" satellites (40–200 satellites). All of these designers employed circular orbits; and even with this simplification, constellation design was considered at best a difficult and time consuming trial and error exercise.

The motion of any artificial satellite may be described using a number of parameters. The eccentricity, e, is a measure of the amount of ellipticity. An orbit which has a greater eccentricity number is more elliptical. Eccentricity e=0 would describe a circle, any number between 0 and 1 is an ellipse, and the eccentricity number of 1 or greater would be a parabola or a hyperbola, respectively (curves which never close).

For an elliptical orbit, the earth, or the object being orbited, is at one of the focal points of the ellipse. Therefore, the satellite is sometimes closer to the earth than at other times. The apogee is defined as the point of highest altitude of a satellite, while perigee is the point of lowest altitude.

A retrograde orbit is one in which the direction of revolution is opposite to that of the earth. A posigrade or prograde orbit is an orbit in which the satellite revolves around the earth in the same direction as the earth.

The inclination angle i is an angle measured between the plane of the orbit, and a plane of the reference, usually the Equator. An inclination angle i less than 900 is a prograde orbit, while an inclination angle greater than 90° is a retrograde orbit. A 90° orbit is a polar orbit.

The period, T, is a measure of how long the satellite takes to make one entire orbit. Mean anomaly M is another way to describe the position in the orbit. Mean anomaly is a fictitious angle indicating the fraction of 360 degrees corresponding to the fraction of the period through which the satellite has passed at any point of its orbit.

The Right Ascension of the Ascending Node ("RAAN") is an angle between the first point of Aries ($\gamma$), a non-rotating celestial reference, and the line of nodes, which is the line forming the intersection of a plane of the orbit and the plane of the equator. The line of nodes gives a measure of the position or orientation of the orbit. The longitude of the ascending node n is the angle between the i unit vector (pointing towards the Greenwich meridian) and the ascending node, in the rotating reference.

The argument of perigee $\omega$ is an angle measured in the plane of the orbit between the point of the ascending node and the nearest point of perigee.

Most practical satellites prior to the invention by the present inventors used relatively simple systems based on circular orbits. The earth was covered symmetrically by multiple satellites, which each operate to cover a section of the earth.

Elliptical orbits have been typically avoided in the art, because of their asymmetries, and the consequent problems that they might cause. However, some individual elliptical orbits and elliptical orbit constellations have been proposed. The Russian Molniya orbit is a posigrade orbit designed for polar and high latitude coverage. Other posigrade orbits have been described by John Draim in his U.S. Pat. Nos. 4,809,935 and 4,854,527. 4,809,935 describes a three-satellite constellation giving continuous coverage of the entire Northern hemisphere, and an extension of this constellation to include an equatorial orbit resulting in a four-satellite array giving continuous global coverage of both hemispheres. This latter four satellite array provided somewhat higher elevation coverage in the Northern hemisphere than in the Southern Hemisphere.

U.S. Pat. No. 4,854,527 describes a common-period four-satellite array giving continuous global coverage with satellites at a lower altitude range than in the first patent. A discussion of obtaining extra Northern Hemisphere coverage through use of elliptic satellite constellations may be found in ANSER Space Systems Division Note SpSDN 84-1, "Satellite Constellation Design Techniques for Future Space Systems" dated September 1984, by John Draim and James Cooper. Another application of posigrade elliptic orbits is the ACE 20 and ACE-Prime orbits developed by Mr. A. Turner of Loral Corporation.

The present invention also simplifies the design of the solar panels by requiring no more than 1 or 2 degrees of freedom. In the example orbit discussed herein which is 116° retrograde, the panels need only one degree of freedom since the satellite in the plane containing the earth-sun line, i.e. midnight or noon ascending node. In a similar way, a satellite usually needs to radiate its heat toward cold, empty space. In the present invention, it is much easier to face the satellite in a way that always faces the heat radiators away from the sun.

It is also well known that the earth is not totally spherical, but actually it is rather oblate. That is, the earth is bigger at the bottom than it is at the top. The $J_2$ harmonic, due to the earth's oblateness, causes the node $\Omega$ and argument of perigee $\omega$ of an orbit to change. The gravitational pull of the earth's equatorial bulge causes, for example, the orbital plane of an eastbound satellite to swing westward. More generally, the force component is directed towards the Equator. This resultant acceleration causes any satellite to reach the Equator (node) short of the crossing point where it would have reached it on a spherical earth. For each revolution, therefore, the orbit regresses a $\Delta$ amount. These effects have been the subjects of various attempts at compensation.

Sun synchronous circular orbits are also known. These are orbits where the rotation rate of the right ascension of the ascending node is equal to and in the same direction as, the right ascension rate of the mean sun.

SUMMARY OF THE INVENTION

The previous specifications, of which this is a continuation-in-part, described the invention of non-uniform capacity distribution tailored by latitude and population. This was done using an elliptical satellite array, and tailoring the parameters by latitude and population, and/or by time of day. Specific ways of carrying out these options by using a retrograde inclined orbit, and/or a sun synchronous apogee elliptical orbit are described.

The present specification also considers the special ground-control problems posed by these satellite constellations, and more specifically how to most effectively carry out ground station communication with ground communication stations ("GCS") and tracking, telemetry and control ("TT&C") stations.

The satellites of the present invention most preferably communicate with ground-based TT&C stations at least once during every revolution of the satellite. This preferred satellite architecture uses satellites that circle the earth once every three hours.

According to one preferred satellite constellation and orbit, the satellites orbit at a different rate than that at which the earth rotates. Therefore, the satellites see different positions on the earth during different times in their rotation periods. This produces special constraints on earth station placement. The inventors of the present invention have discovered a way to minimize the number of TT&C earth stations which are necessary to meet the above goal.

According to another aspect of the invention, a low circular orbit is used in conjunction with the satellites of the present invention, and to avoid interference with other systems.

Most geosynchronous-orbiting satellites communicate with the earth in the so-called C-band. Each satellite has a specific geosynchronous position, to avoid interference between communications between the various satellites. The inventors noticed that one problem with low circular orbiting satellites is that their communications could interfere, at times, with the geosynchronous satellites. The present invention teaches a way to avoid this problem by placement of earth stations and by tracking of positions of various satellites to avoid the interference.

BRIEF DESCRIPTION OF THE DRAWINGS

These and other aspects of the invention will now be described in detail with reference to the accompanying drawings, wherein.

DESCRIPTION OF THE PREFERRED EMBODIMENT

Figure 1:
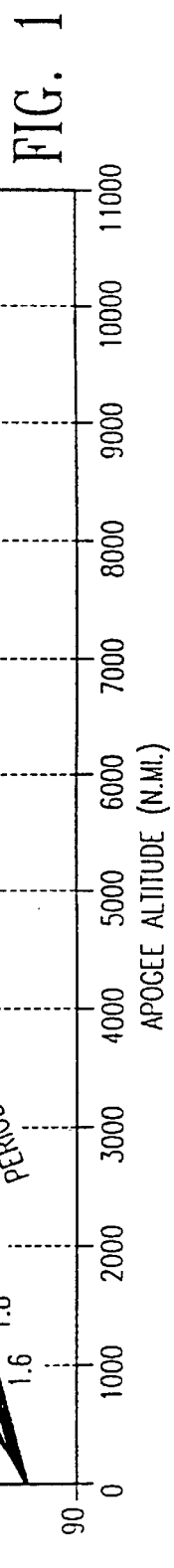
FIG. 1 shows a first design space for elliptical sun synchronous retrograde orbits according to a first embodiment of the present invention.

The present invention exploits the gravitational effects from the earth's oblateness, in combination with a preferably elliptical orbit, to allow preferential coverage of different parts of the earth as a function of parameters which are related to satellite demand. This has significant advantages since it allows preferential coverage based on a chosen characteristic, here either one hemisphere over the other, or time of day.

For instance, a satellite system primarily intended for use cover the United States would prefer to preferentially cover the Northern hemisphere as opposed to the Southern hemisphere. More specifically, by choosing elliptical orbits such that anything above 40° south latitude was covered, a great majority of the world's land mass could be covered without wasted capacity.

This embodiment of the invention optimizes the characteristics of the elliptical satellite to have desired coverage characteristics. According to this first preferred mode, structure is described for putting a satellite in a special orbit which preferentially covers part of the earth over the other part.

The first type of orbits, discussed according to the present invention herein, are elliptical retrograde orbits which provide preferential coverage of one part of the earth over the other part through adjustment of orbital parameters.

As mentioned above, all orbits are effected by the earth's $J_2$ gravitational term. This term effects the $\omega$ and $\Omega$ terms of every orbit. In order to compensate the orbit, the general equation $$\frac{d\omega}{dt} + \frac{d\Omega}{dt} = 0.98 \quad (1)$$

must be satisfied. This first embodiment takes a special case of the equation (1).

The significance of the constant on the right hand of the equality sign in Equation (1) lies in its synchronism with the Earth's yearly motion about the Sun. In order to preserve the orientation of the orbital plane with respect to the earth-sun line, it is necessary to advance the plane of the orbit by 360 degrees/365.25 days or 0.9856 deg/day.

Specifically, the effect of $J_2$ term on $\Omega$ and $\omega$ can be expressed as follows:

$$\frac{d}{dt}\Omega_{J_2} = -1.5nJ_2(R_E/a)^2(\cos i)(1-e^2)^{-2} \quad (2)$$
$$\cong -2.06474 \times 10^{14} a^{-7/2}(\cos i)(i-e^2)^{-2}$$

$$\frac{d}{dt}\omega_{J_2} = 0.75nJ_2(R_E/a)^2(4-5\sin^2 i)(1-e^2)^{-2} \quad (3)$$
$$\cong 1.03237 \times 10^{14} a^{-7/2}(4-5\sin^2 i)(1-e^2)^{-2},$$

, where n is the mean motion in degrees per day, $R_e$ is the earth's equatorial radius, a is the semi major axis in kilometers, e is the eccentricity, i is the inclination and the change in $\Omega$ and $\omega$ are both in degrees per day.

According to this first embodiment, we want to make $d\omega/dt$ term approach zero. Luckily, this can be easily done by adjustment of the sine term in equation 3 to zero. Therefore, we set 5 $\sin^2 i=4$, requiring that $\sin^2 i=4/5$ or i=arc sin {square root (4/5)}; so i=63.435° or its complement 116.565°.

This embodiment preferably uses an elliptical orbit of 116.565 degrees. The prior art has used circular sun synchronous orbits. All so-called circular orbits may have some slight degree of ellipticity. For purposes of this specification, an elliptical orbit is defined as an orbit whose ellipticity is greater than 0.002. This effectively excludes circular orbits which are slightly elliptical due to imperfections in the orbits. These elliptical orbits, with e≈=0.001 are sometimes called frozen orbits.

Therefore, we set $$\frac{d}{dt}(\omega)$$

to zero, and we set $$\frac{d}{dt}(\Omega)$$

to +0.9856, the amount per day by which the earth+s revolves around the sun. By substituting this into equation (3), a set of combinations of apogee, perigee and inclination are found which satisfy the attached formula which are shown in the attached FIG. 1.

For an elliptical sun synchronous orbit, only a very small circumscribed part of this design space can be used. First, this satellite should have no apsidal rotation, to keep the apogee in one hemisphere. Accordingly, the inclination must be 116.565°. A certain amount of leeway is possible, however, and practically speaking the orbit can be inclined anywhere between 115 and 118° and still obtain sufficiently stable characteristics, although some minor orbit corrections may be necessary from time to time.

Along this line, only a certain class of orbits are usable. Circular orbits are known in the prior art, and do not have the ability to produce the preferential coverage characteristics in the way done according to the present invention. Therefore, a leftmost limit on the design space shown by point 102 in FIG. 1 represents the limit to require an elliptical orbit. The rightmost limit is set by the minimum satellite height at perigee. A satellite orbit should be, practically speaking, greater than, for example, 100 nautical miles. Preferably, the lowest limit is 250. The point 104 represents the position where perigee will fall below 100 nautical miles. Therefore, the design space extends between the points 102 and 104. Within this design space, the inclination varies between 115° and 119°. The usable design area is therefore shown in the box in FIG. 1.

Within that box, period varies from 2.6 to 3.1 hours, apogee varies from 100 to 4600 nautical miles, and perigee varies from 100 to 2200 nautical miles.

These orbits allow the coverage to be adjusted, or biased, to favor the Northern hemisphere over the Southern hemisphere.

More specifically, the allowable range of orbital parameters includes orbital periods between 2.68 and 3.1 hours, and orbital eccentricities between 0.002 and 0.38.

The postulated orbit preferably has an orbit or orbits with the integral period value of 3.0 hours. This 3-hour orbit with corresponding mean motion of an even 8 revolutions per day will result in a repeating ground track. The use of other, non-integral values for orbital period(s) still results in the satellite's ground track crossing the Equator on the ascending and descending nodes at given values of local time, but the points of such crossings will not now occur at fixed longitudinal points. Any point along the design space horizontal line (116.565 degrees) may be selected to provide a base line set of orbital parameters upon which such an orbit or constellation may be configured.

Applications

This invention may be used for communications, earth sensing, surveillance, weather, or any other satellite function found useful for satisfying mission requirements. The invention can be used in a single satellite mode, and will provide better coverage during daylight hours than during nighttime hours. Effectively, coverage is "stolen" from nighttime coverage and diverted to daytime coverage. The most probable future application of the invention in this case will be found in the construction and use of ordered arrays (or constellations) of such satellites.

In order to show how this system would be used, a few examples from the design space in FIG. 1 will be discussed herein. These examples are analyzed using a computer program such as Orbital Workbench, or OSAC written by the Naval Research Lab, or Graftrak, available from Silicon Solutions, Inc; Houston Tex. This program is run with the inclination, apogee and other information from the chart in FIG. 1. The characteristics of that orbit are obtained. Then, the desired characteristics are used to modify the orbit until the proper places from the design space are identified. Some preferred orbits according to the present invention will be described herein.

The second embodiment of the present invention is one which produces a special kind of elliptical orbit. This special orbit has a constant-pointing apogee, which faces in a constant direction relative to the sun all year round. This is obtained by a posigrade orbit in which the equation $$\frac{d\omega}{dt} + \frac{d\Omega}{dt} = 0.98 \quad (1)$$

is satisfied.

Figure 2:
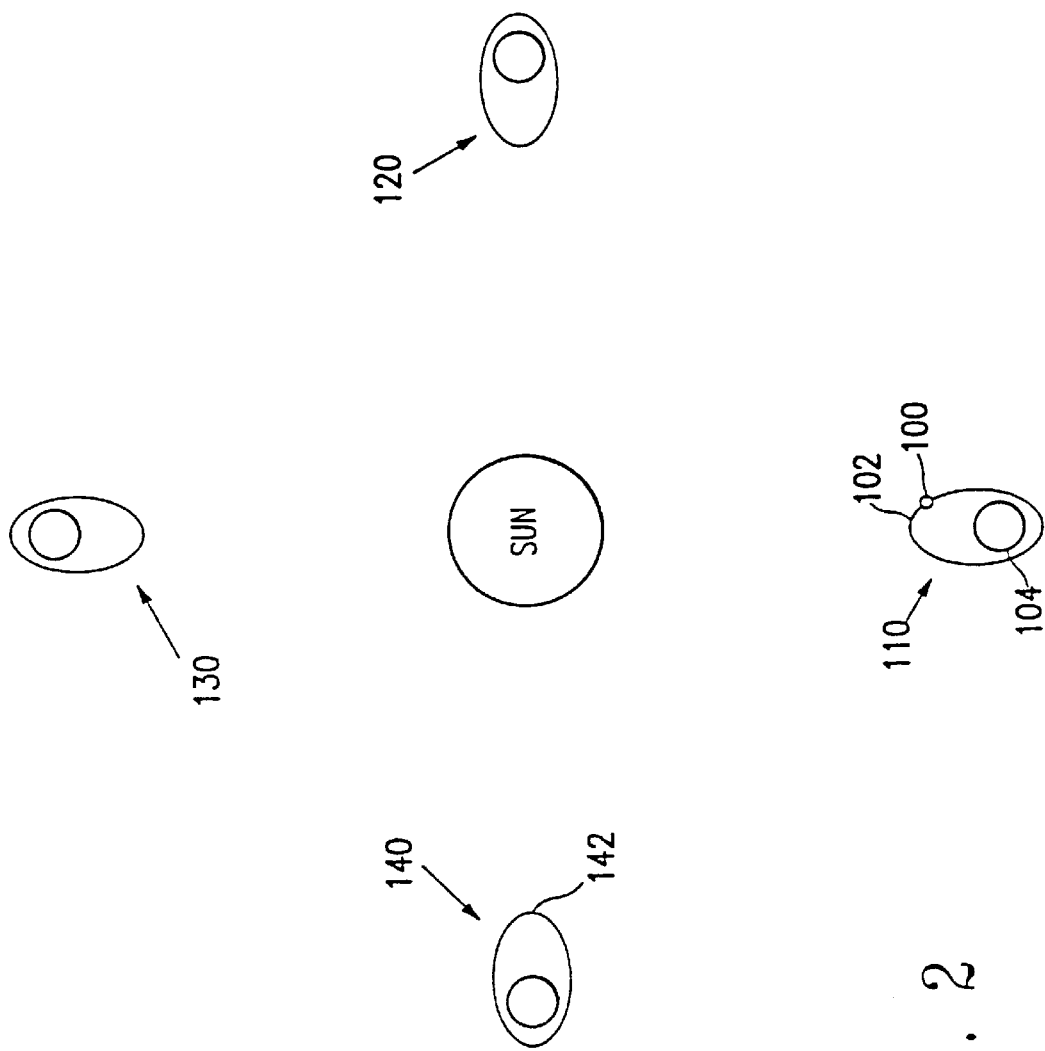
FIG. 2 shows the characteristics of a special orbit according to a second embodiment of the present invention in which the apogee is always pointing towards the sun.

FIG. 2 shows a resulting sun synchronous orbit with apogee pointing towards the sun. This preferred embodiment of the present invention comprises a satellite in an orbit which has a sun synchronous apogee which assumes an orbit around the earth such that the apogee of the satellite is always facing towards the sun. The satellite 100 is shown with its orbit 102, orbiting the earth 104. Different seasons find the earth at different portions around the sun, and these portions are shown as positions 110, 120, 130 and 140. The apogee point, shown as element 142, is always facing the sun.

Figure 3:
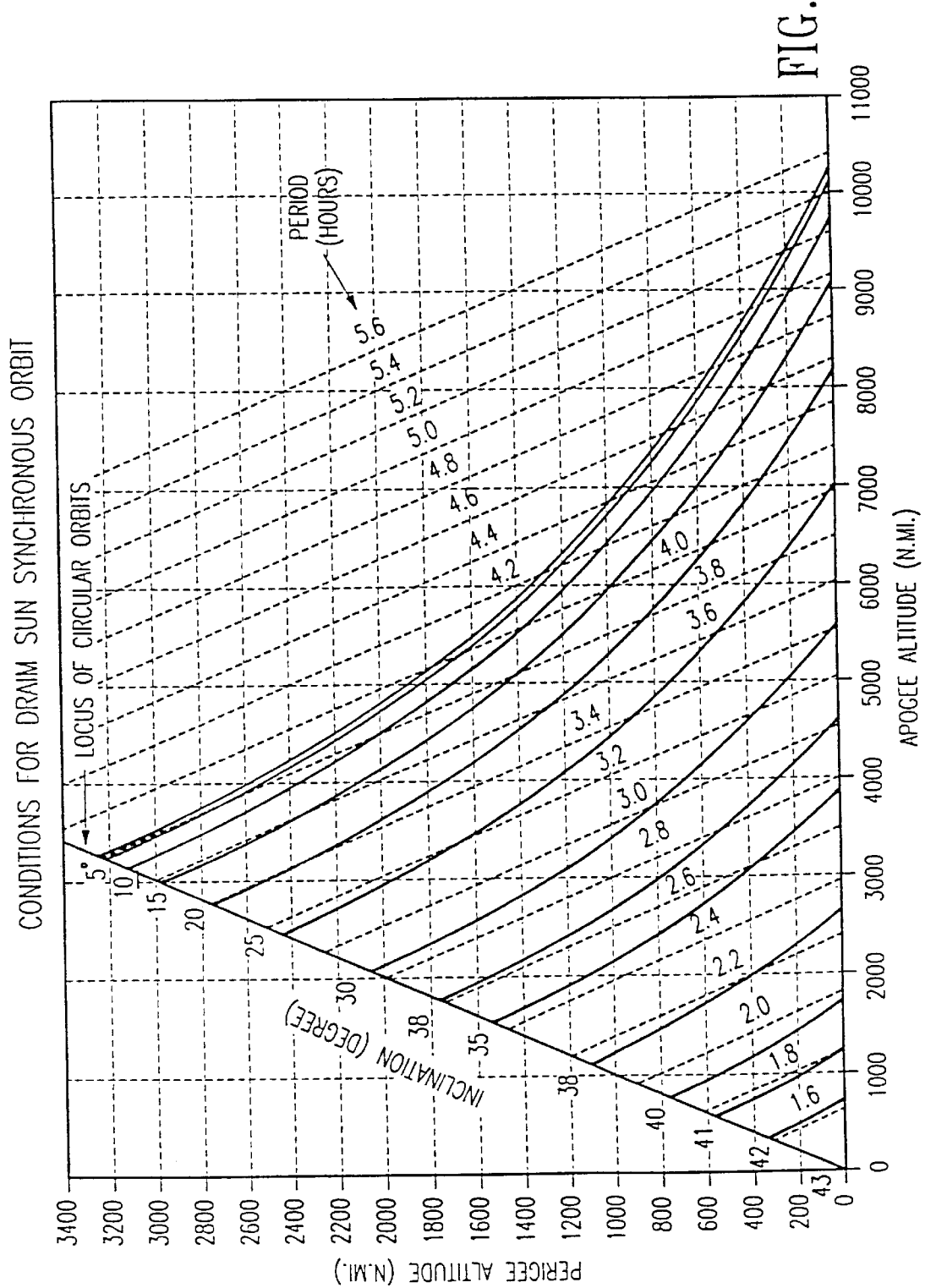
FIG. 3 shows a design space for this second embodiment of the present invention using prograde orbits.

To obtain the preferred operating range for this equation, the equations $$\approx -2.06474 \times 10^{14} a^{7/2} (\cos i)(i-e^2)^{-2}$$

$$\frac{d}{dt}\Omega_{J_2} = -1.5 n J_2 (R_E/a)^2 (\cos i)(1-e^2)^{-2} \quad (2)$$

$$\frac{d}{dt}\omega_{J_2} = 0.75 n J_2 (R_E/a)^2 (4 - 5\sin^2 i)(1-e^2)^{-2} \quad (3)$$

$$\cong 1.03237 \times 10^{14} a^{7/2} (4 - 5\sin^2 i)(1-e^2)^{-2}$$

are combined with equation (1) to plot the characteristics shown in FIG. 3. FIG. 3 shows the apogee altitude, perigee altitude, and inclination forming the design space. As in the first embodiment, only certain parts of this design space can be used. For example, the practical limit on the altitude of a satellite is greater than 100 nautical miles. All other parts of this design space can be used.

These orbits have characteristics which are synchronous with respect to the time of year. By specifying any initial RAAN and epoch, therefore, the Right Ascension of the apogee of this orbit will stay constant over time with respect to the sun. For one special class of orbits, the apogee will always be pointing towards the sun as shown in FIG. 3. For another special class of orbits, the apogee will be pointing for example at 2 degrees relative to the sun. In any of these orbits, therefore, the apogee is controlled to be constant.

For this embodiment, the apogee is always at a constant right ascension angle from the right ascension of the earth-sun line: usable inclinations range from 0 to 43 degrees, usable periods from 1.7 to 5.0 hours (again, preferably 3 hours to obtain a repeating ground track), and usable eccentricities from 0.0002 to 0.56.

A few examples of how these orbits would be chosen and the characteristics thereof are explained herein.

According to another preferred mode of the invention, the first and/or second embodiments are further modified to include multiple satellite configurations. This modification comprises a constellation of satellites which preferentially cover the Northern hemisphere, as compared with the Southern hemisphere or vice versa.

Figure 4:
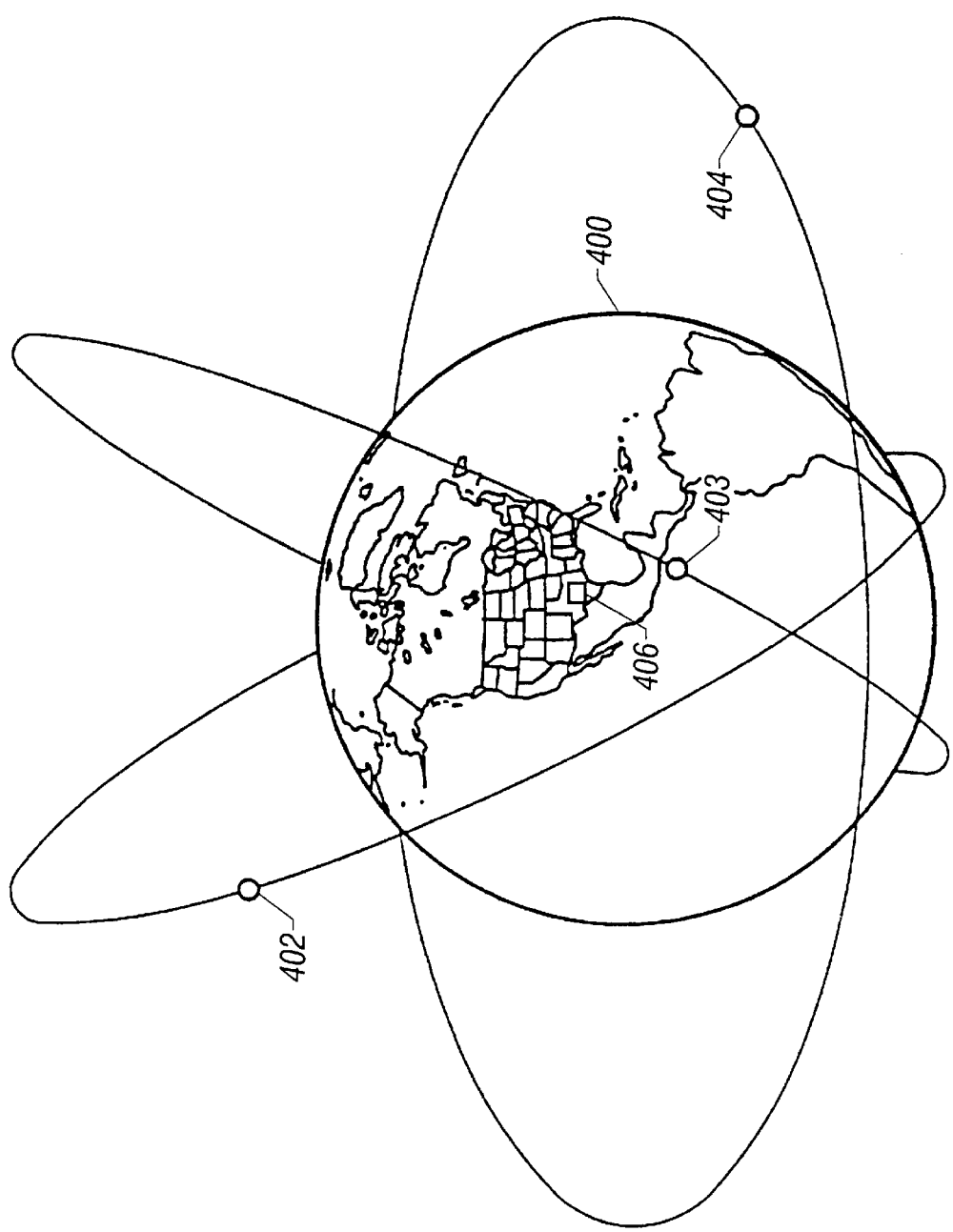
FIG. 4 shows a constellation of satellites, each orbiting and communicating with earth stations on the earth.

The constellation of satellites orbiting the earth 400 is shown in FIG. 4. Of course, it should be understood that while FIG. 4 shows only three satellites, 402, 403 and 404, in reality there would be many more. These two satellites are located and operate to preferentially cover one portion of the earth over another (first embodiment) and/or one time of day (second embodiment) over another.

Each of the satellites communicates with a earth-based earth station, shown schematically as station 406, in a conventional way to exchange information therewith. Accordingly, the present invention also contemplates use of an earth station with such satellites, this earth station having characteristics to track satellites having the characteristics discussed above, and to communicate therewith. There are a plurality of earth stations, each. positioned on the earth, and each including tracking equipment to track a motion of at least one of said satellites. Each earth station, and each satellite also includes communication equipment to communicate between the earth station and the at least one satellite.

Figure 5:
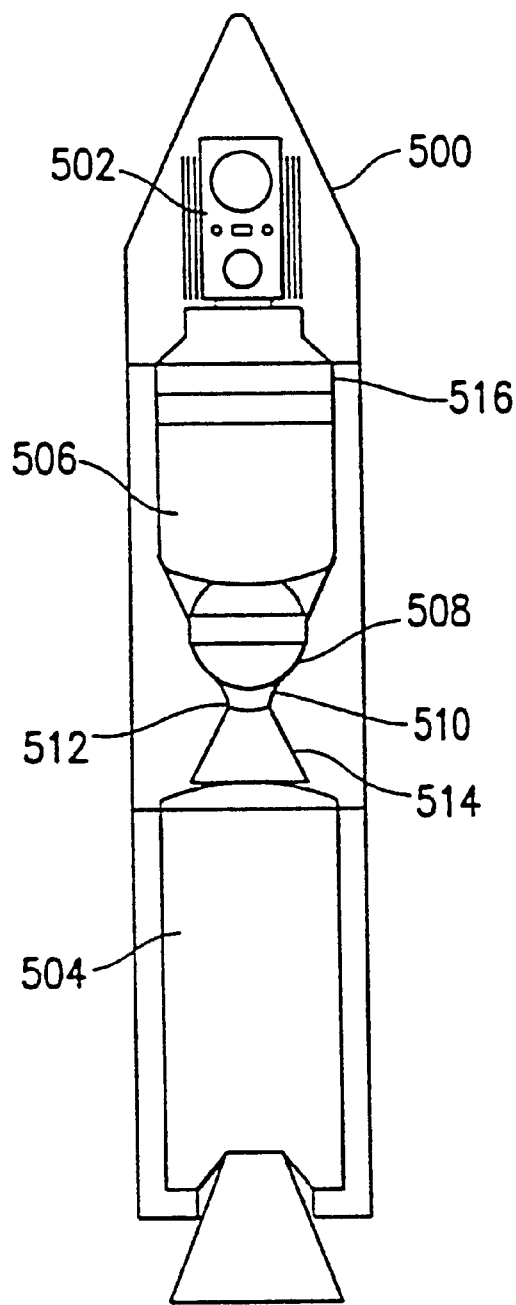
FIG. 5 shows a rocket and inertial guidance unit used according to the present invention to propel the rocket into orbit.

The satellites according to the present invention are initially boosted into their orbits by special rockets of the type intended to deliver satellites. One such rocket, 500, with the satellite 502 therein is shown in FIG. 5. The rocket includes a first stage engine 504, of any known solid or liquid fuel type, and a second stage engine 506. Rocket engines are well known in the art, and it will be assumed that the second stage engine is a liquid type rocket fuel engine. This engine combines a liquid fuel with an oxygenator at point 508, which ignites the fuel. The ignition accelerates the speed of the fuel through a constriction 510, causing a sonic shock wave shown as 512 which travels out the output nozzle 514. (It must be understood that the fixture in FIG. 5 shows this stage rocket with the first stage still attached.)

The rocket is controllable both in direction and in thrust. More generally, the vector control of the rocket is controllable.

The rocket is controlled by an onboard navigation computer 516. The basic characteristics of a booster rocket and guidance unit are shown, for example, in U.S. Pat. No. 4,964,340, the disclosure of which is herewith incorporated by reference.

According to a fourth embodiment of the rocket of the present invention, the inertial guidance unit is controlled to boost the rocket into an elliptical retrograde orbit selected from the design space box around line 100 shown in FIG. 1. The satellite is then delivered into that orbit, to maintain that orbit.

According to a fifth embodiment of the present invention, the rocket of FIG. 5 has an internal guidance unit which is programmed to boost the rocket into a posigrade orbit of an elliptical type, selected from the design space shown in FIG. 3. At that time, the satellite is released into the orbit, to thereby maintain thereafter the appropriate orbit.

The third, fourth and fifth embodiments are usable in combination with either of the first or second embodiments described above.

Some examples of the preferred orbits used according to the present invention will now be described.

First preferred orbit configuration

The first preferred orbit is a four satellite minimum array ring which covers any northern hemisphere region north of 20° north latitude during daylight hours, with a minimum 15 degree elevation angle σ. The satellites have an optimized afternoon ascending node, a three hour period and an argument of perigee ω other than 270. The ellipse actually therefore tilts towards the sun and provides a ring of orbits which are both sun synchronous and always have their apogee pointing towards the sun.

The characteristics of these orbits are such that the satellites appear to be moving backwards from west to east since they are in retrograde orbit.

Using the basic satellites discussed above, selection of the main orbital parameters were adjusted through trial iterations beginning around the beginning values of ω=270 and RAAN=F(YY, MM, YY, HH, MM, and SS). The resulting graph track view show visibility circles and lines which reach down to a certain latitude.

This system is very unique, since with only four LEO-MEO satellites, all regions north of 20° latitude can be covered with visibility angles of 15°. It would take three to four times as many circular satellites to do the same thing.

Second preferred orbit configuration

The second preferred orbit covers everything in the northern hemisphere above 20° north latitude both day and night. One ring of satellites has noon ascending nodes and the other has midnight ascending nodes. This has the significant advantage of simplifying the design of the solar array of the satellite.

Most satellites have solar arrays, which need to face the sun in order to power the satellite. If we use an orbit like the present example, then this solar array needs only one degree of freedom to follow the sun. This simplifies the satellite design. This requirement is satisfied by placing one ring with noon ascending nodes and another ring with RAANs displaced 180° from the first ring and having midnight ascending nodes.

Figure 6:
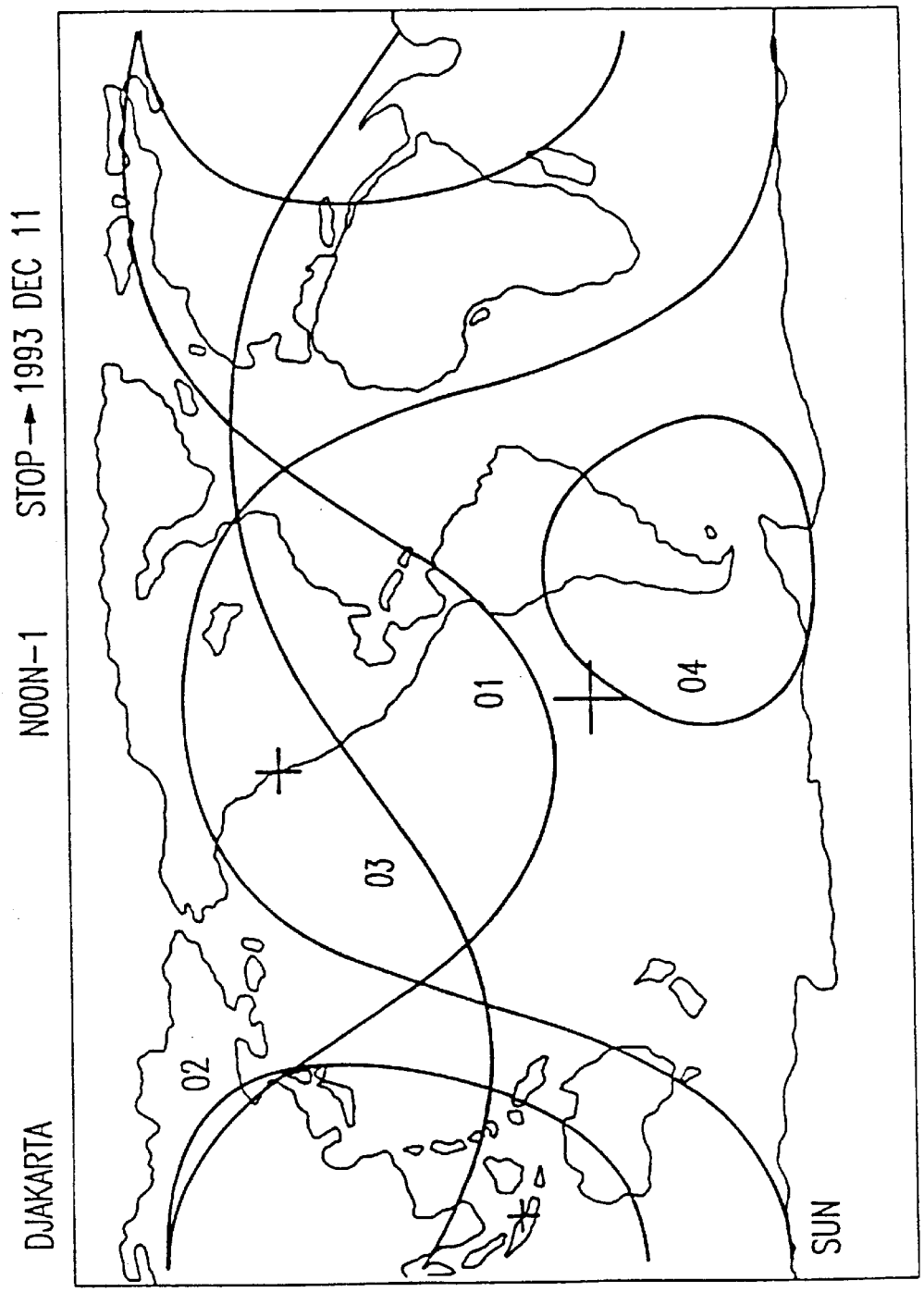
FIGS. 6, 7A, 7B, 8A, 8B, 9A, 9B, 9C, 10A and 10B show characteristics of preferred orbits of the present invention.
Figure 7A:
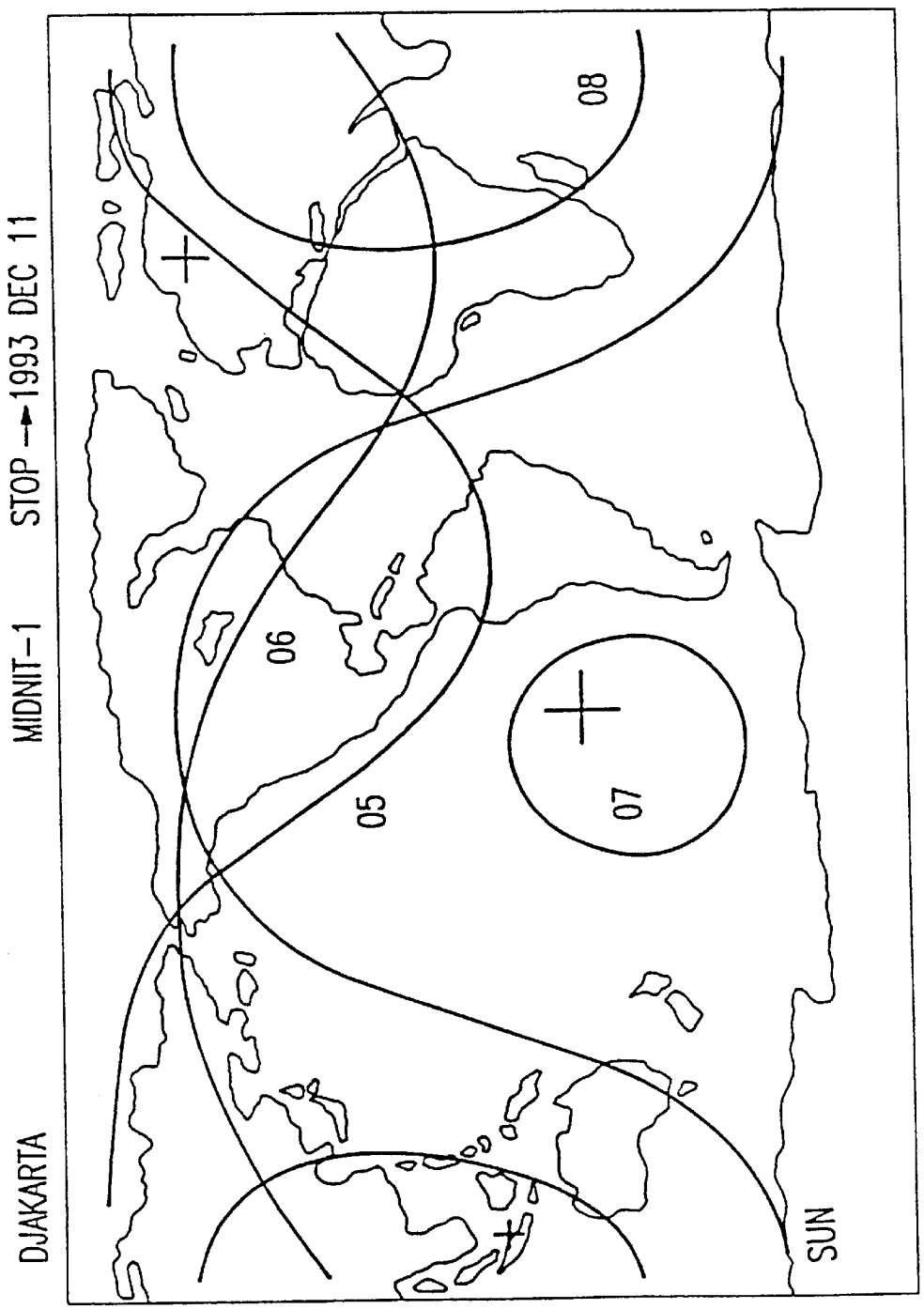
Figure 7B:
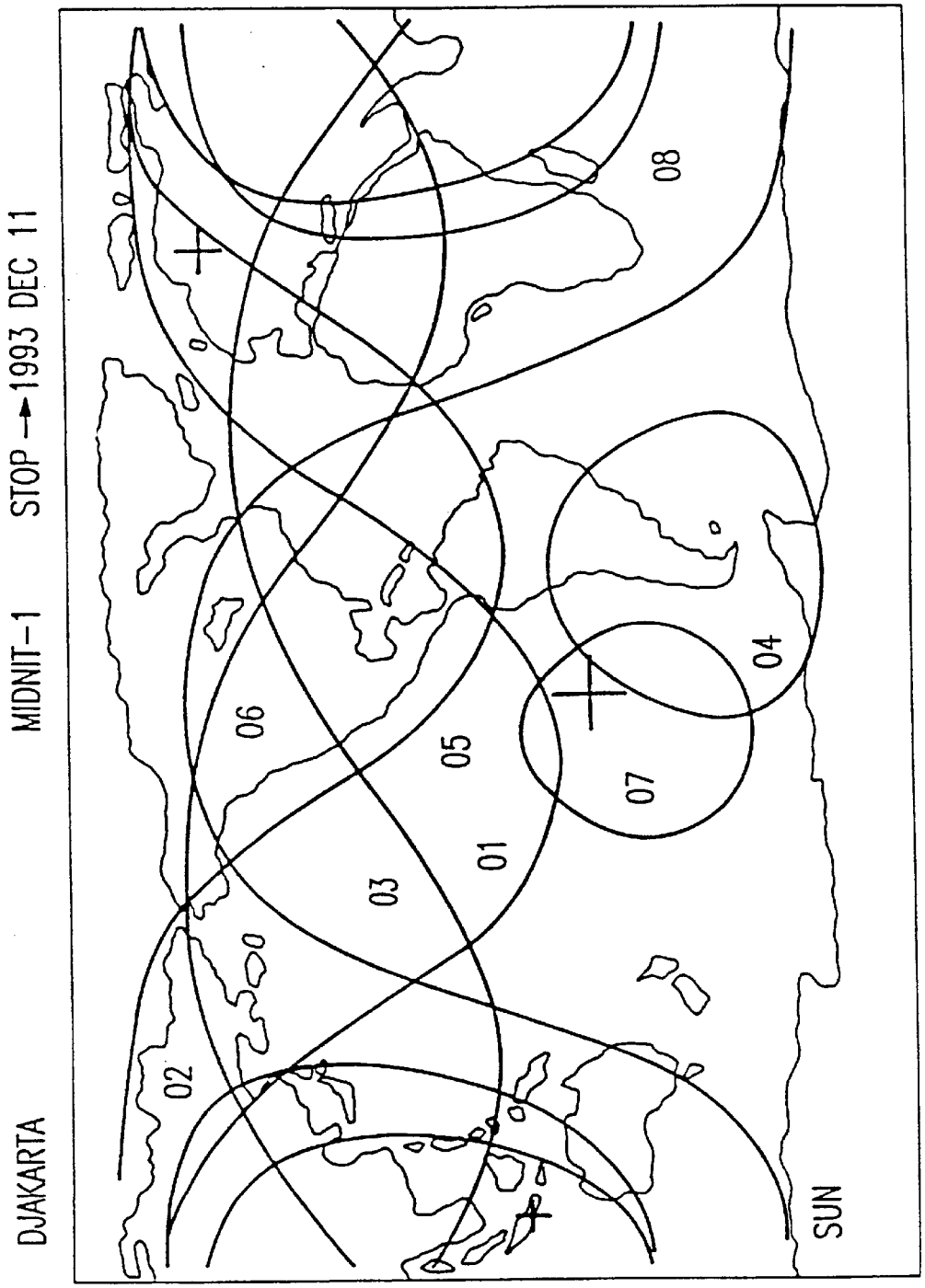

FIGS. 6, 7A and 7B show this basic orbit. FIG. 6 shows the noon orbit, and the four satellites therein, labelled 01, 02, 03, and 04. FIG. 7A shows the midnight ring, with the satellites labelled 05, 06, 07, and 08. FIG. 7B shows the noon plus midnight rings. The combined view of FIG. 7B shows that most of the coverage is in the northern hemisphere. There is only spotty coverage in the southern hemisphere, but the clustering is in the north.

Third preferred orbit configuration

A third example is a six satellite equatorial, prograde, apogee pointing towards the sun orbit. This third example uses terms of the formula for advance of the line of nodes at 0.9856° per day and provides an extra degree of redundancy and higher elevation angles in the tropical and equatorial zones.

Fourth preferred orbit configuration

Figure 8A:
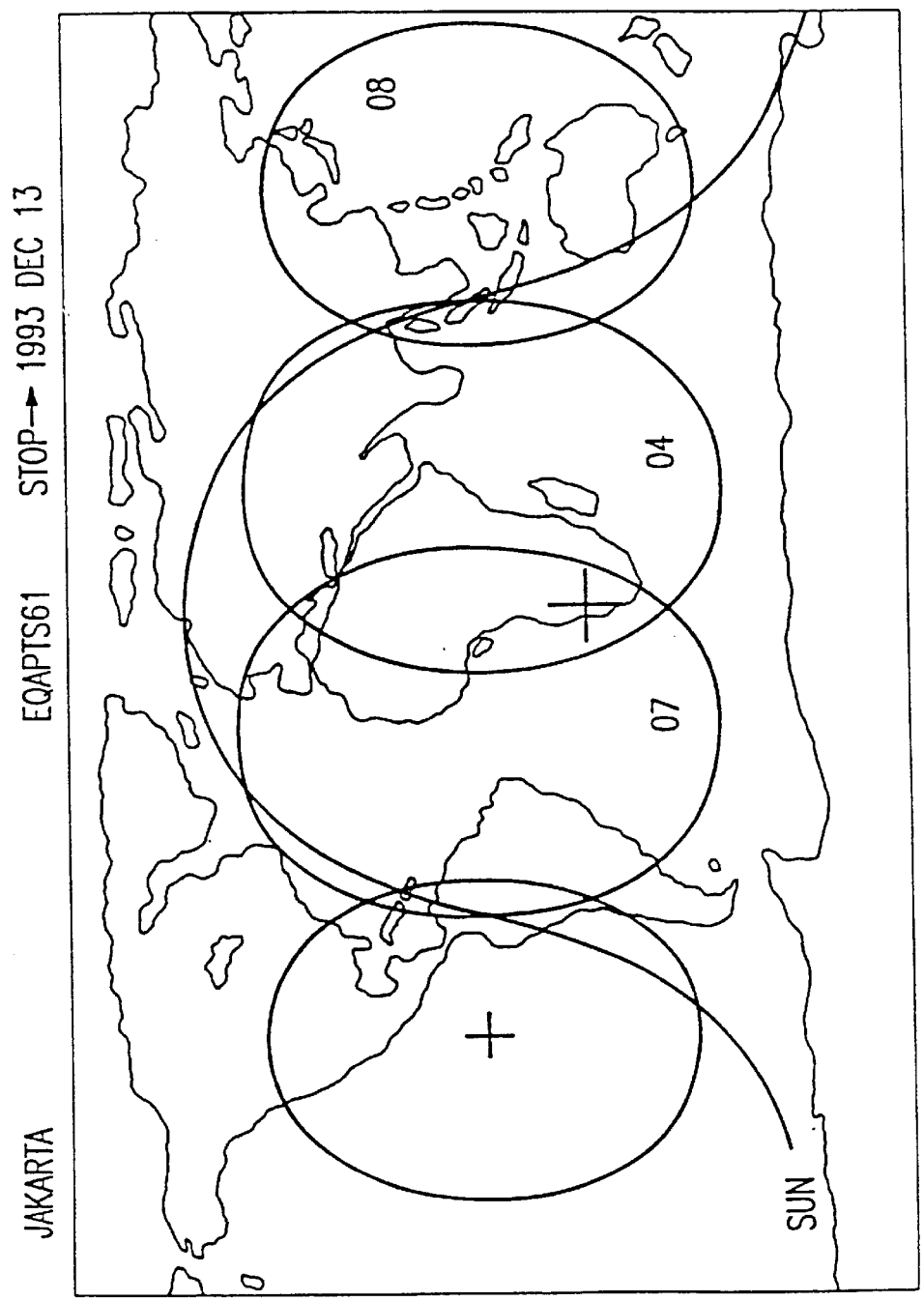
Figure 8B:
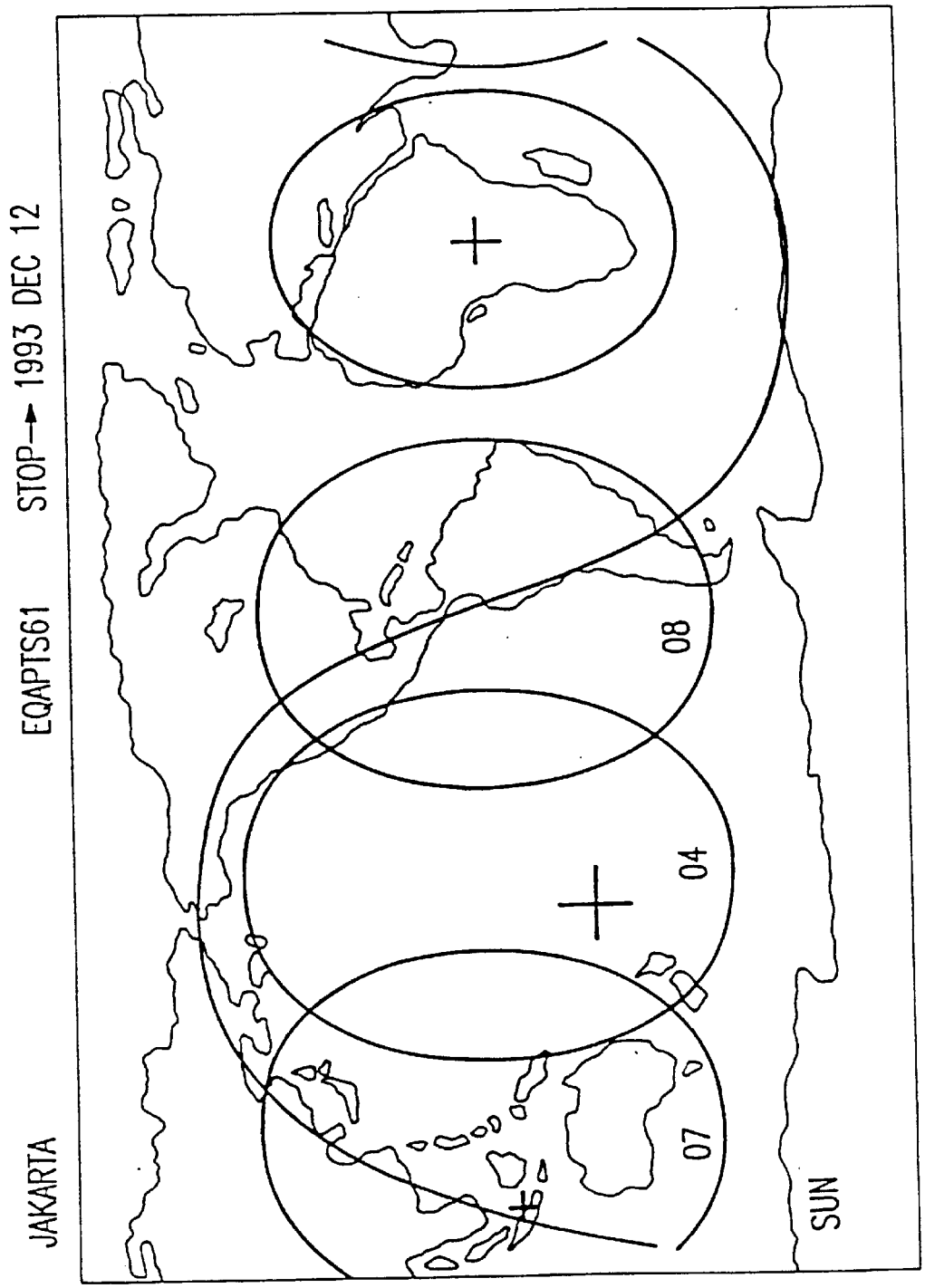

The fourth example is another equatorial prograde orbit with apogee pointing towards the sun with only four satellites. This array emphasizes continuous equatorial region daytime coverage with visibility angle of 10°. FIG. 8A shows 1100 GMT which is daylight over Europe, and shows that most of Europe is well covered. However, Europe is less well covered at 2300 GMT shown in FIG. 8B.

Fifth preferred orbit configuration

Figure 9A:
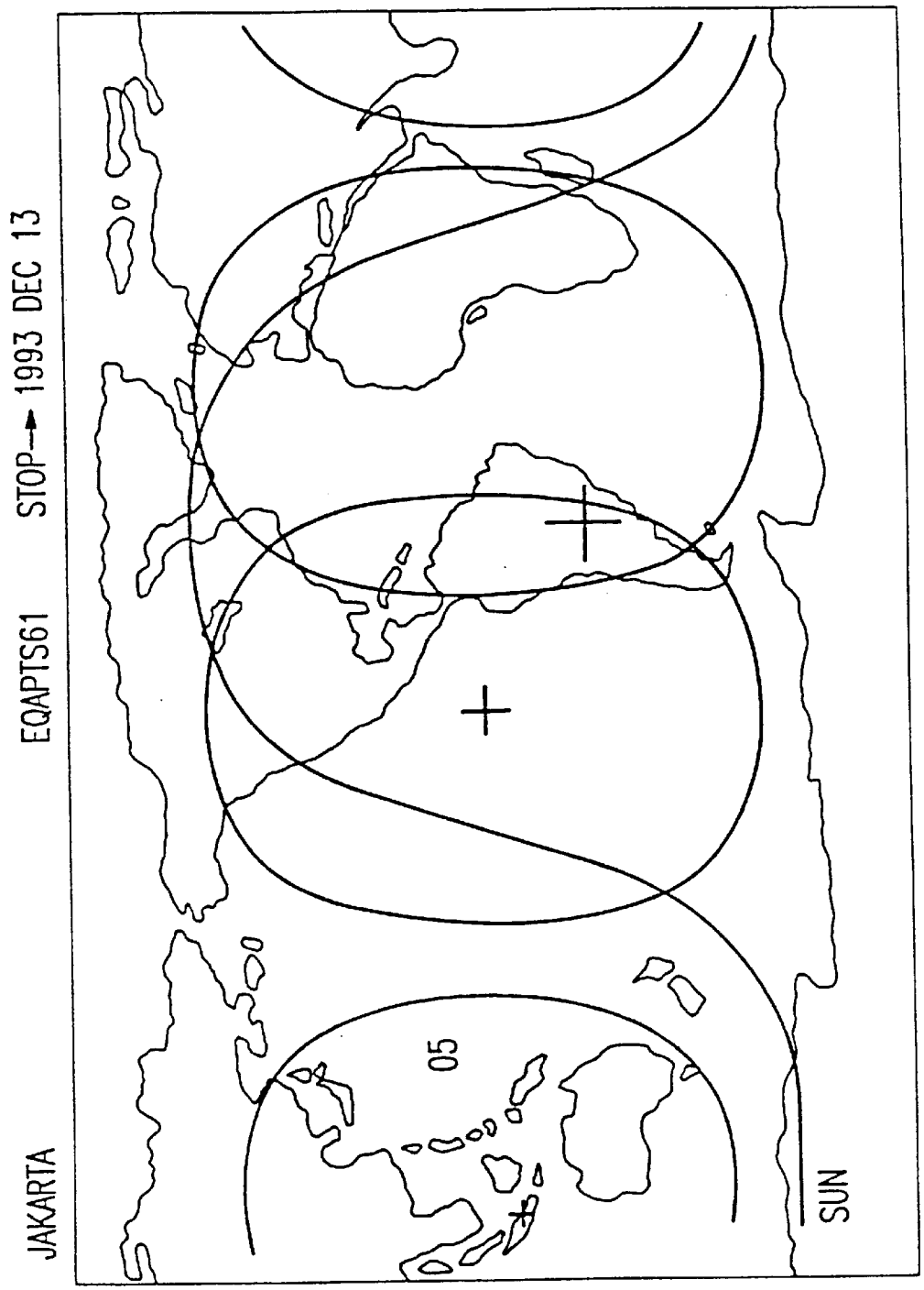
Figure 9B:
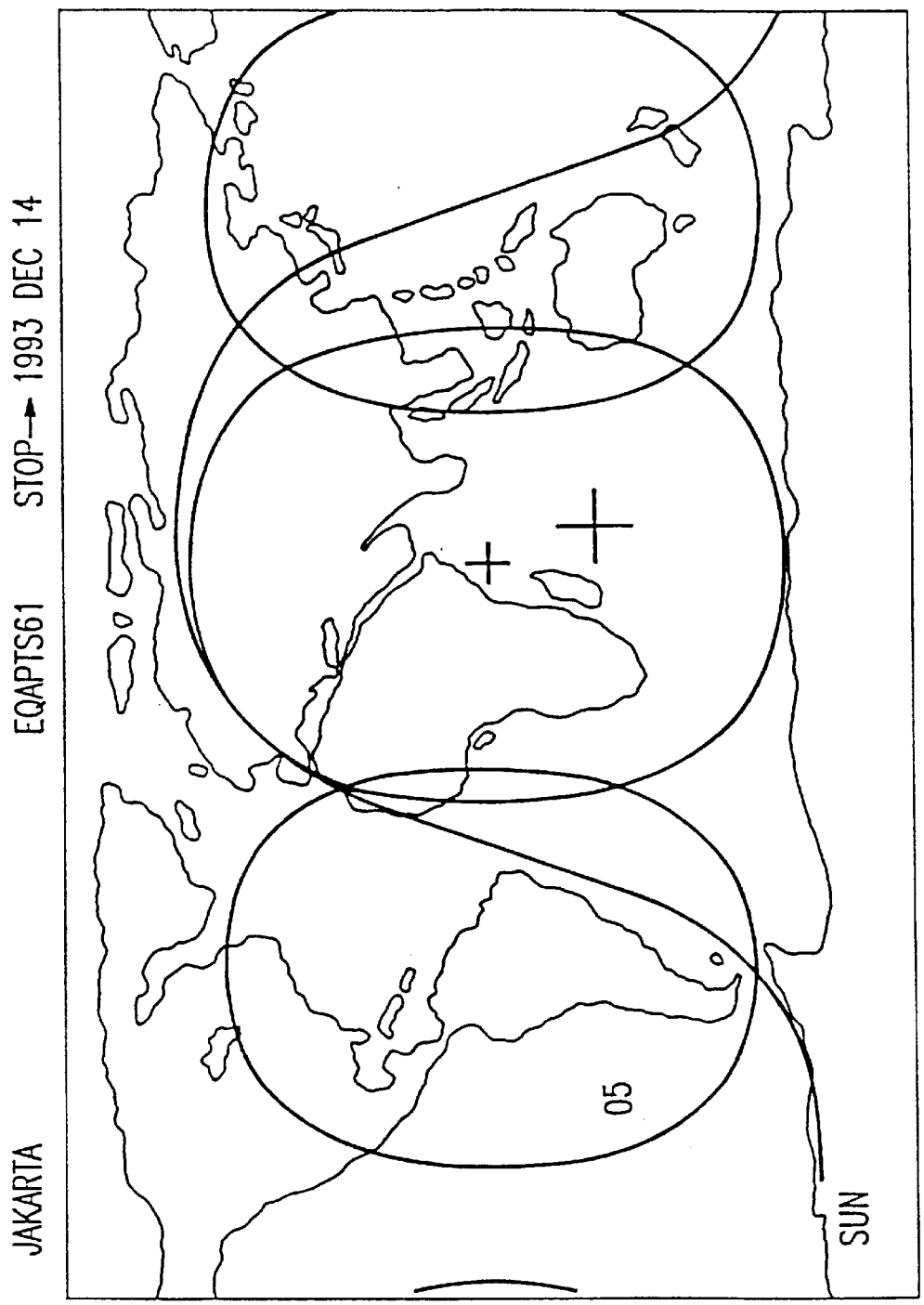
Figure 9C:
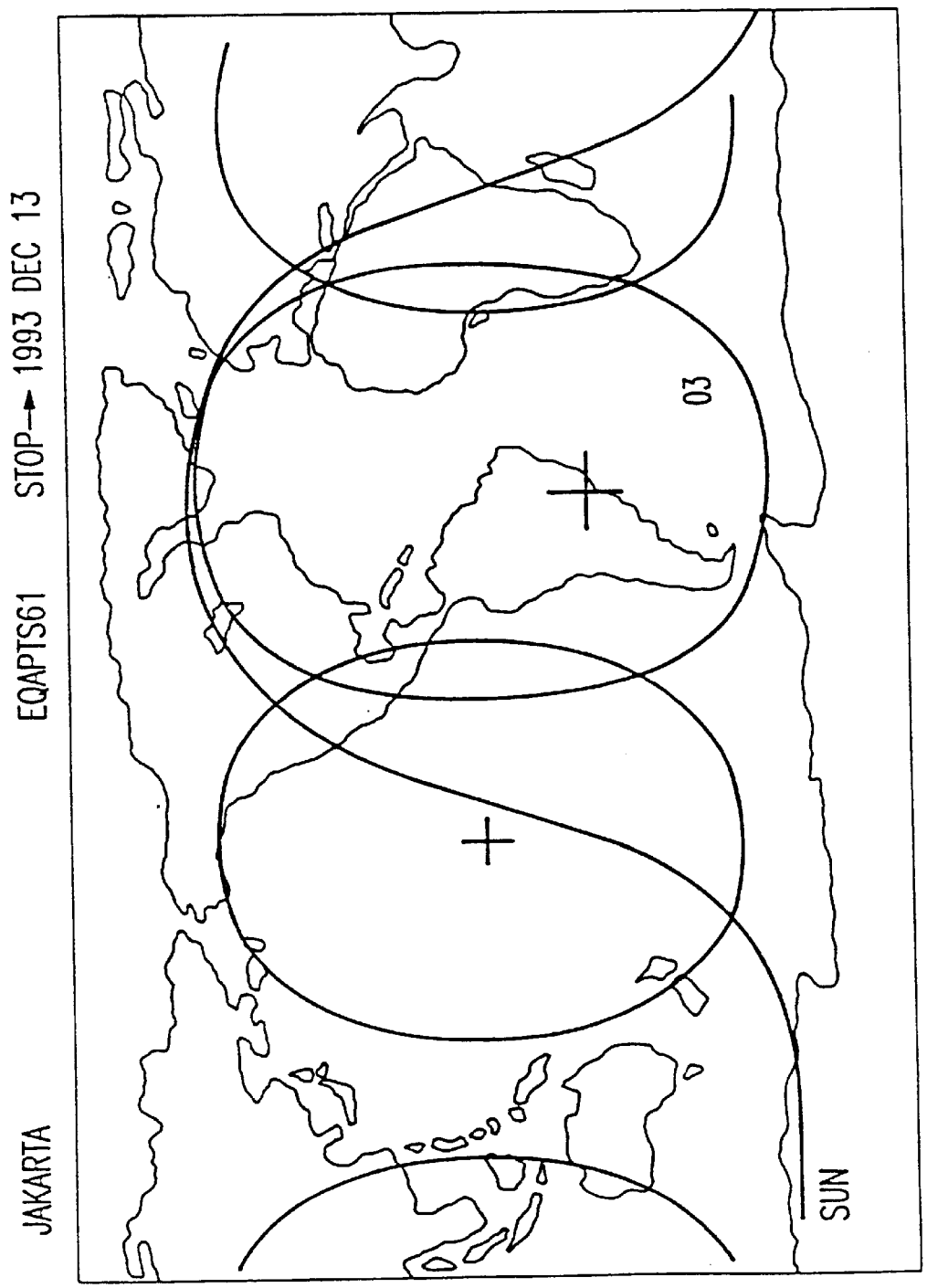

The fifth preferred orbit constrains the visibility angle to 0° and obtains continuous equatorial region daytime coverage with only three satellites. Again, there are gaps at nighttime, but none in the daylight hours. FIGS. 9A, 9B, and 9C show the various daylight hour coverages. FIG. 9A shows coverage at 1535 GMT, FIG. 9B shows coverage at 740 GMT, and FIG. 9C shows coverage at 1500 GMT.

Sixth preferred orbit configuration

Figure 10A:
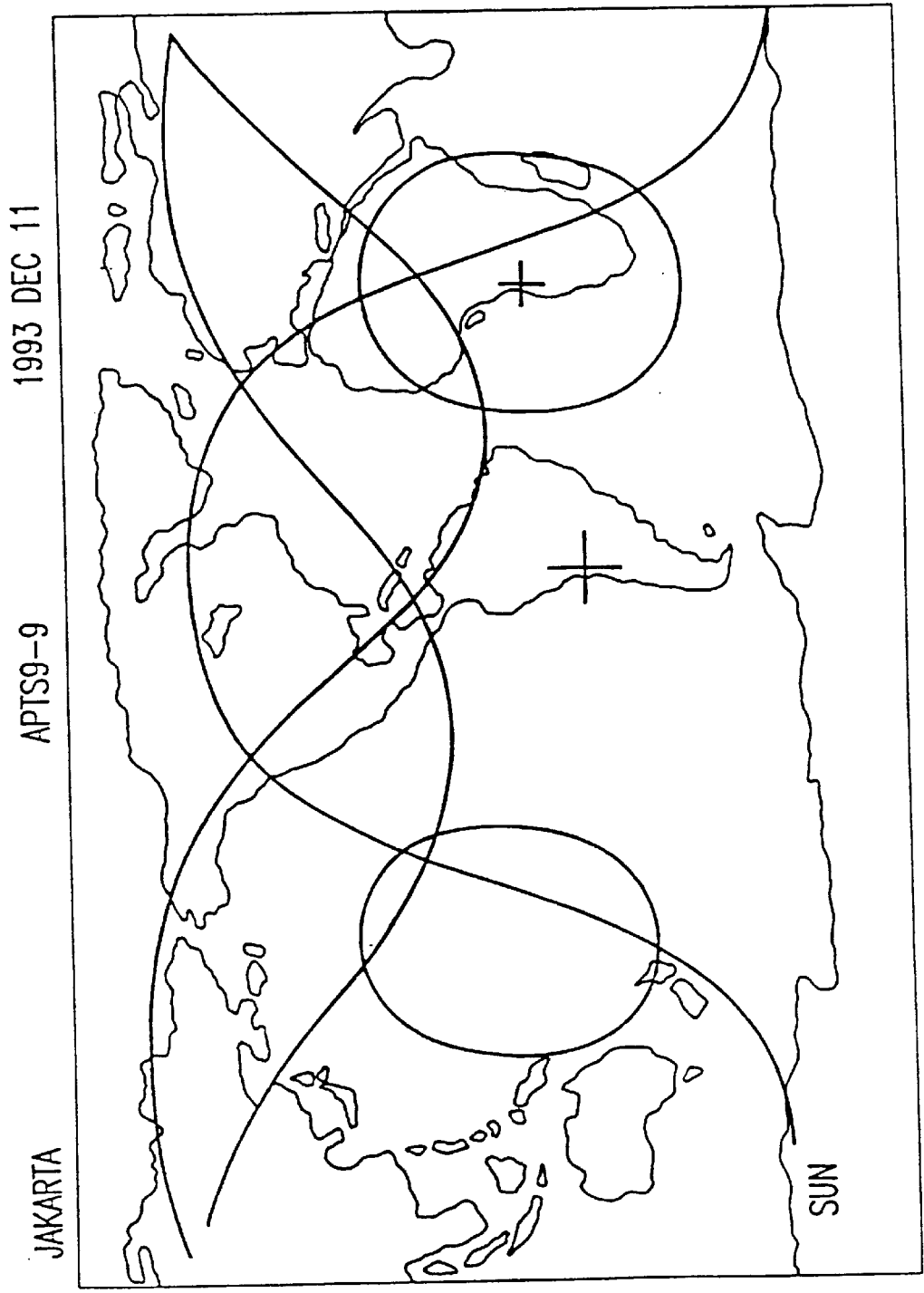
Figure 10B:
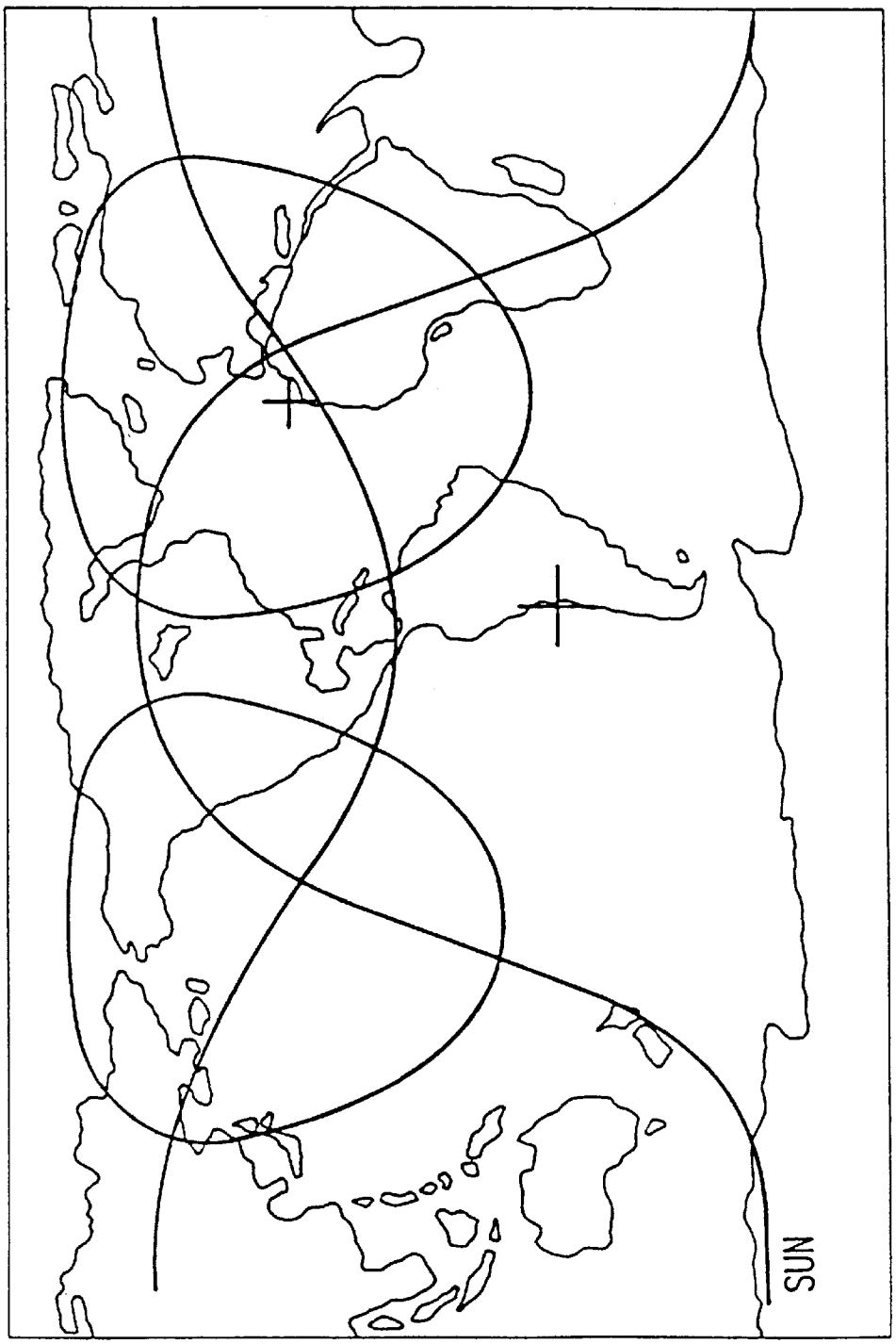

The sixth preferred orbit is shown in FIGS. 10A and 10B. This four satellite array combines classic sun synchronism condition of $$\frac{d\Omega}{dt} = 0.9856$$

with the apogee on the sunward side of the earth. ω=262°. Apogee always occurs close to the meridian of the Earth at local apparent noon. This four satellite array provides continuous coverage of day lit areas north of 20° north latitude all year round in all countries. This sixth example has an afternoon ascending node, apogee at noon, a forced inclined plane, and a three hour period with the apogee equals about 4000 nautical miles.

Preferred Constellation and Earth Station Placement

Figure 11:
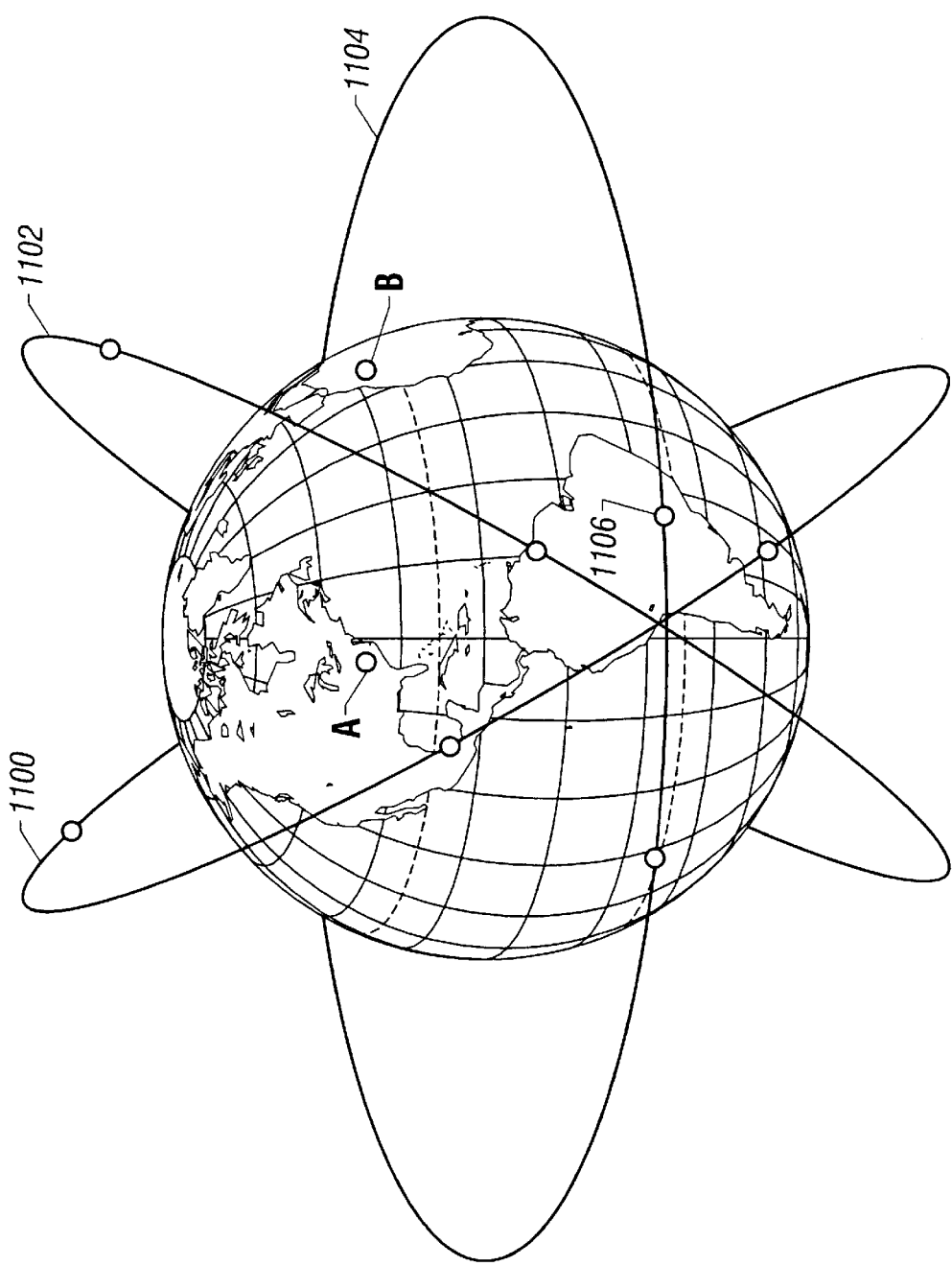
FIG. 11 shows a diagram of the satellites orbiting the earth according to a preferred configuration of the present invention.

The preferred satellite constellation which covers most of the earth, but preferentially covers the northern hemisphere, is shown in FIG. 11. This constellation includes two inclined elliptical rings of satellites 1100 and 1102. Each of these inclined elliptical satellite rings preferably includes four satellites, each having perigees in the southern hemisphere. The present inventors have called these Borealis(TM) orbits. These orbits have a period of three hours, a semi major axis of 10,561 kilometers, eccentricity of 0.347, inclination of 116.5°, right ascension of the ascending node of 89.198 and argument of perigee of 269.6. Since the orbit period is 3 hours, the satellites repeat their ground track every 24 hours. Rings 100 and 102 each include four satellites, equally spaced in time and hence having different mean anomalies. It should be understood that the descriptions given herein are for the ring 1102, and that the ring 1100 has very similar but complementary characteristics.

The low earth orbit ring 1104 is a circular or moderately-elliptic earth orbit with a 7800 kilometer height above the earth, 0° inclination and which preferably includes eight satellites.

Figure 12:
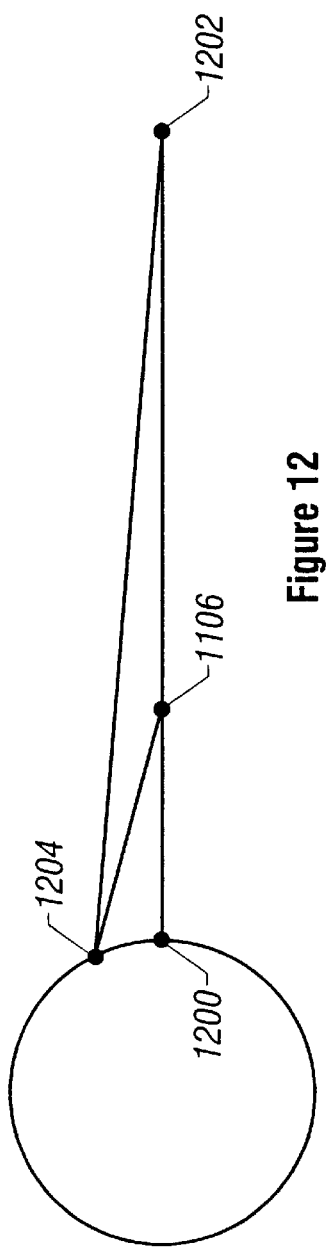
FIG. 12 shows a conceptual diagram of the communication between a geosynchronous satellite and a low earth orbit circular satellite.

This constellation communicates with ground control stations. FIG. 12 shows a ground control station 1200 at a location on the equator intended to track a geosynchronous ("geo") satellite. Looking from this hypothetical point on the equator, there would be times when the extension of the beam to the geo satellite and the beam to the low earth orbit circular satellite would cross. At that moment, the feeder uplink would be illuminating both satellites and both satellites might re-transmit the signals to the ground. FIG. 12 shows if communication with satellite 1106 were attempted from position 1200, this could cause interference with communications to the geo satellite 1202 if both communications used the same band.

The present technique avoids that interference, and therefore allows use of standard and commercially-available satellite communication equipment. All of this equipment operates on the same band. The present inventors, by determining a way in which interference could be avoided, make it commercially feasible to use satellite orbits which would otherwise potentially interfere with geosynchronous satellites.

Figure 13:
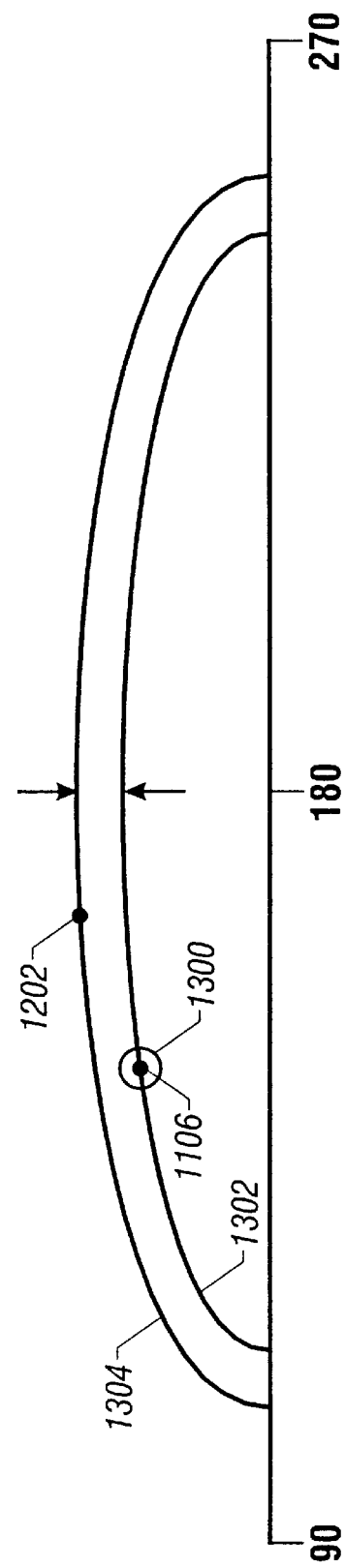
FIG. 13 shows an azimuth/elevation plot showing the view of a satellite track from a position at 10° north latitude.

The inventors of the present invention noticed that if an earth station were located at point 1204, the ground view of the satellites would be that shown in FIG. 13. Specifically, by locating the GCS station at least at 5° north latitude, and preferably at 10° north latitude to 40° north latitude, this problem may be avoided.

A typical feeder beam 3° in diameter 1300 is shown tracking the satellite 1106. This beam never intersects the geo satellite 1202. Looking from the ground, in fact, an observer would see a line 1302 for the equatorial satellites in low earth orbit, and would see the line 1304 for the satellites in geo orbit. So long as these paths remain separated by at least the earth station beam width, interference is avoided. This allows the low earth satellite orbit to use the same band of communication which is used for a geo satellite.

According to this aspect of the present invention, therefore, the ground station is situated at a location where the low earth orbit satellite will always appear in the sky at a position which is lower than locations of equatorial geo satellites, by an amount of separation at least equal to a beam width. Preferably this separation is 0.5°, and the beam width is 3°.

The above interference problem is caused by communication with the equatorial satellite LEO ring. A second interference problem is caused when communicating with the inclined elliptical satellite rings 1100 and 1102. Each elliptical satellite in the inclined orbit, at some point in the course of its orbit, will cross the path of a geo satellite as seen by an observer at a specific point on the earth. This is because the earth station is at a point on the earth. It is inevitable that sometimes a straight line will be formed which includes that point on the earth, an elliptical satellite, and a geo satellite. The elliptical satellite communications beam would then have the geo satellite within its path.

The geo satellite operators would object to any system which could cause a possibility of interference with their communications. However, since C band communications equipment is commercially available, it would be most feasible to use this equipment.

The inventors of the present invention noticed that the Borealis orbits 1100 and 1102 communicate with the largest communications area at the apogee of their orbits. At points in the satellite's rotation where the altitude is below heights of around 4000 km down to perigee, less preferably 4000 to 5000 km down to perigee, the amount of land mass with which the satellite communicates is minimal.

Figure 14A:
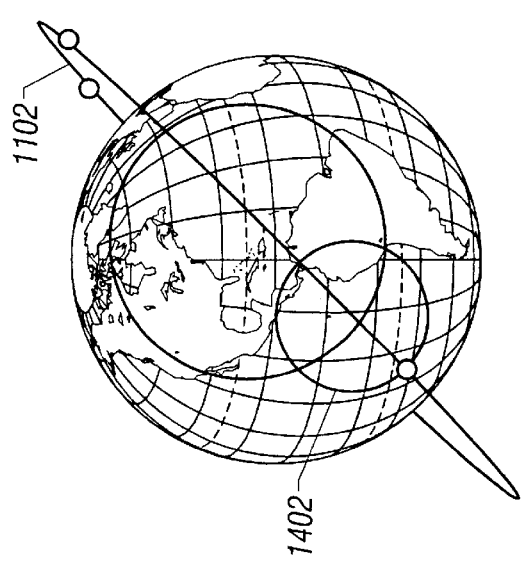
FIG. 14A shows a diagram of a constellation of elliptical inclined satellite orbits.
Figure 14B:
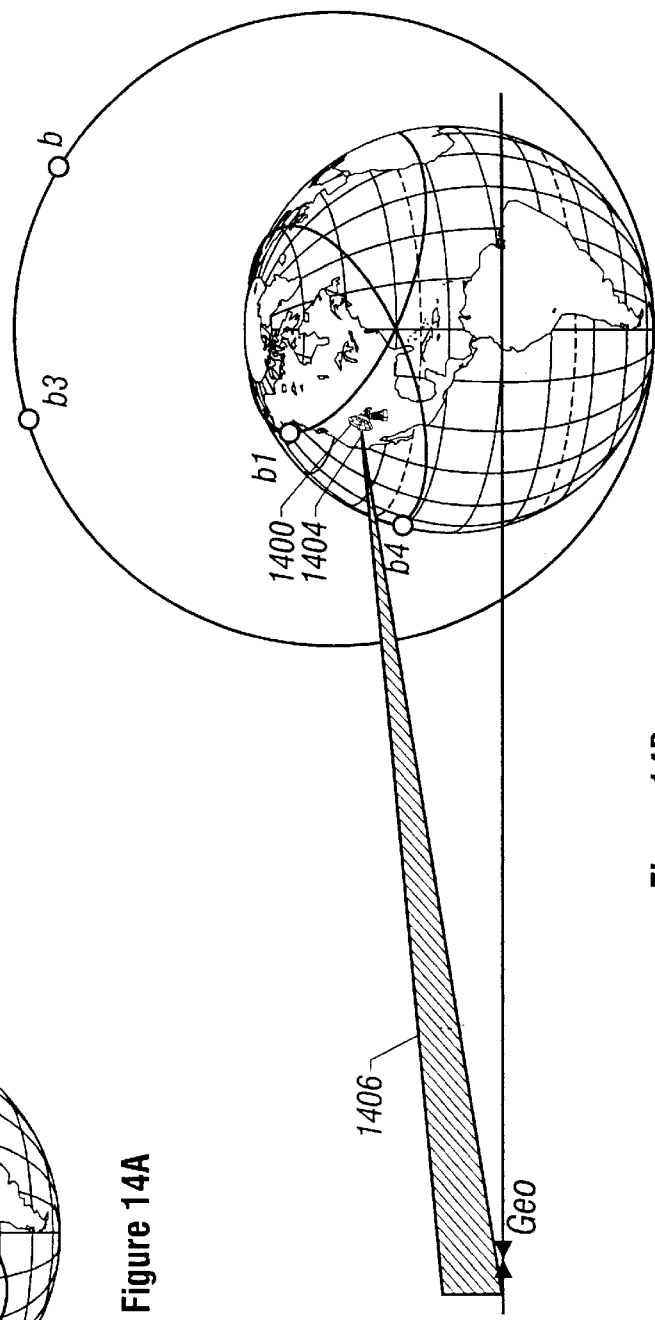
FIG. 14B shows communication between an earth station and one of those elliptical satellites.

FIGS. 14A and 14B show the geometry of the satellite ring 1102. Ground control station 1400 is shown communicating with satellite b4. Satellite b4 produces a footprint 1402 on the earth. The satellite constellations are moving counterclockwise in the sense of FIG. 14B. As the satellite b4 approaches its perigee, however, the feeder beam would impinge on the area of the ring of geostationary satellites.

Figure 15:
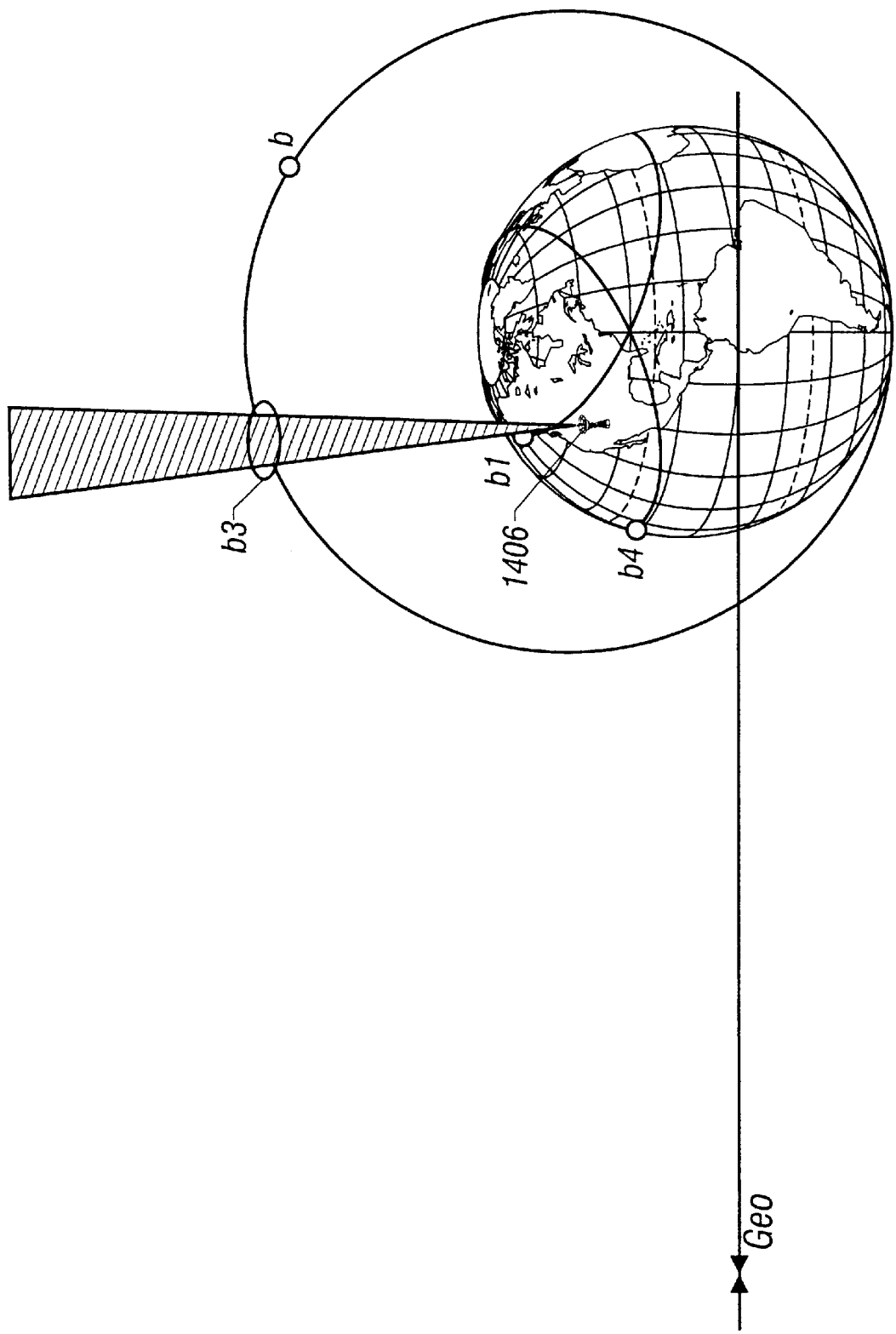
FIG. 15 shows communication between that same earth station and a different one of the elliptical satellites.
Figure 16:
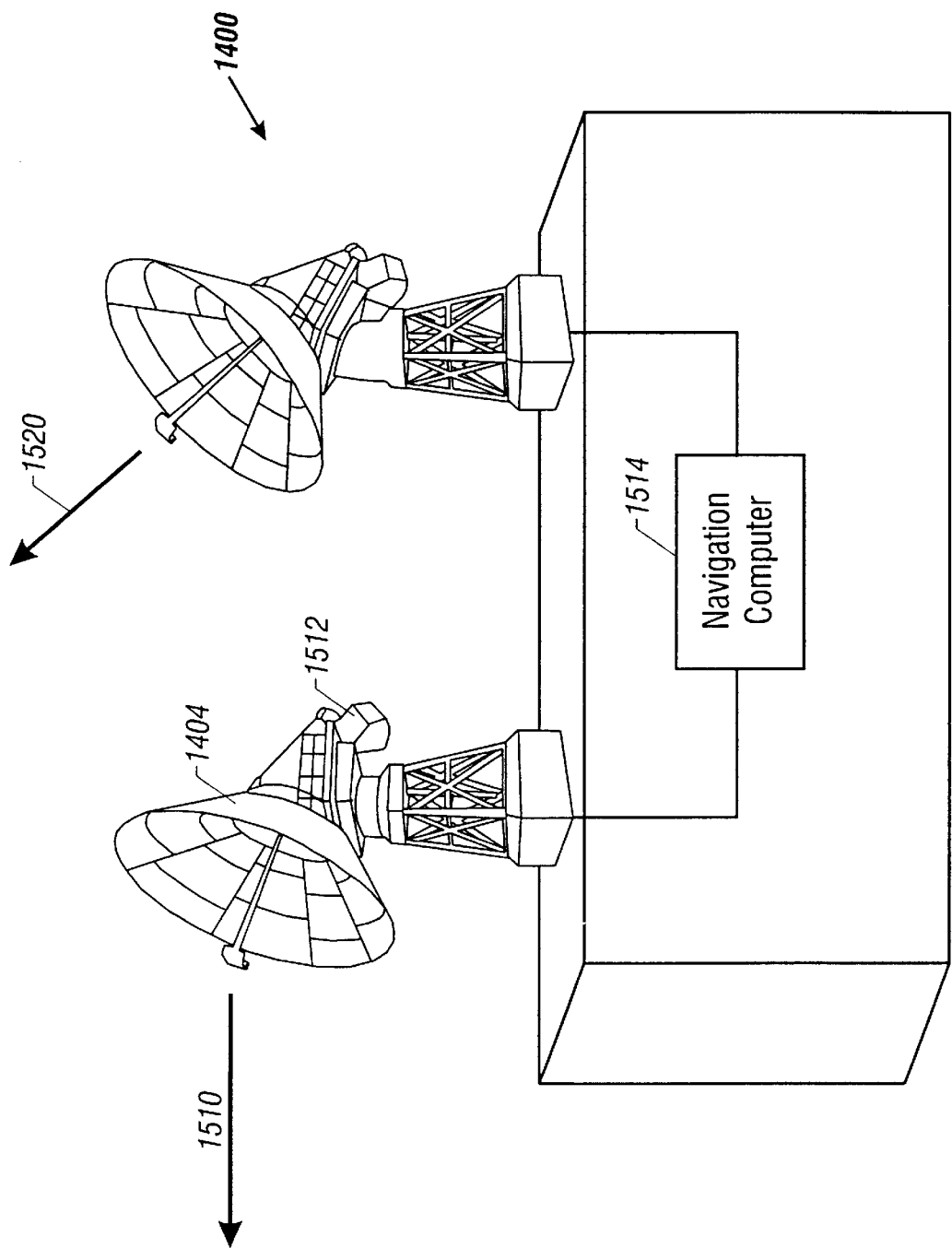
FIG. 16 shows a block diagram of control systems in the earth station computer.

According to the present invention, the ground station 1400 includes at least two antennas, 1404 and 1406 shown in FIG. 16. As the satellite b4 approaches its minimum operational altitude, the 30 wide feeder link beam 1405 illuminates an area which includes the geosynchronous satellite ring, as shown in FIG. 14B. When the link beam approaches that area, the feeder beam from the antenna 1404 is switched off, and the feeder beam from antenna 1406, which tracks the satellite b3, is switched on as shown in FIG. 15. This feeder link beam is now servicing satellite b3, and hence has no possibility of interference with the geosynchronous satellites.

The ground station 1400 should be located at a latitude of 45° north or less to make this operation most effective.

FIG. 16 shows a more detailed layout of the earth station 1400. The antenna 1404 directs its beam 1510 towards the satellite b4. At the same time, the position of the antenna 1404 is being controlled by appropriate commands sent to motor 1512 which controls the azimuth and elevation of the antenna. The motors are also producing signals, coupled through signal lines to a navigation and control computer 1514. Navigation computer monitors these signals, and from the signals calculate the position in space of the beam 1405 illumination, and extension of that position to the height of geo satellites. The navigation computer processes this position information to determine if the 3° beam, once extended to the height of geo satellites, will intersect the area of geo satellites. If so, navigation computer terminates the transmission from antenna 1404, and commands antenna 1406 to begin transmitting beam 1520 to satellite b3. Antenna 1404 is then moved to track satellite b2 (not shown), to prepare for the moment when satellite b3 will reach a position that would intersect the field of geo satellites. This technique avoids any possibility of communications interference with the elliptical satellites.

Yet another aspect of the invention involves the placement of telemetry, tracking and control stations ("TT&C stations"). FIG. 11 shows an earth station, which we can assume to be a TT&C station for purposes of this embodiment, at point A at noon (or midnight). The earth station at position A can communicate with both rings 1100 and 1102. Therefore, each satellite will be able to communicate with the earth station A, at least at one point during each rotation period, at 12:00 noon and at midnight. This communication will be possible for three hours before and after noon or midnight. Therefore, from approximately 9:00 AM—3:00 PM and 9:00 PM—3:00 AM all satellites can communicate with earth station A, which will be able to carry out TT&C for all satellites in the constellation.

At 6:00 AM and 6:00 PM, the earth has rotated such that the same earth station is at position B. That position will be able to communicate with the rings 1102, but the satellites in the ring 1100 will be over the horizon relative to position B and therefore it will not be possible to communicate from position B to satellite ring 1100.

Figure 17:
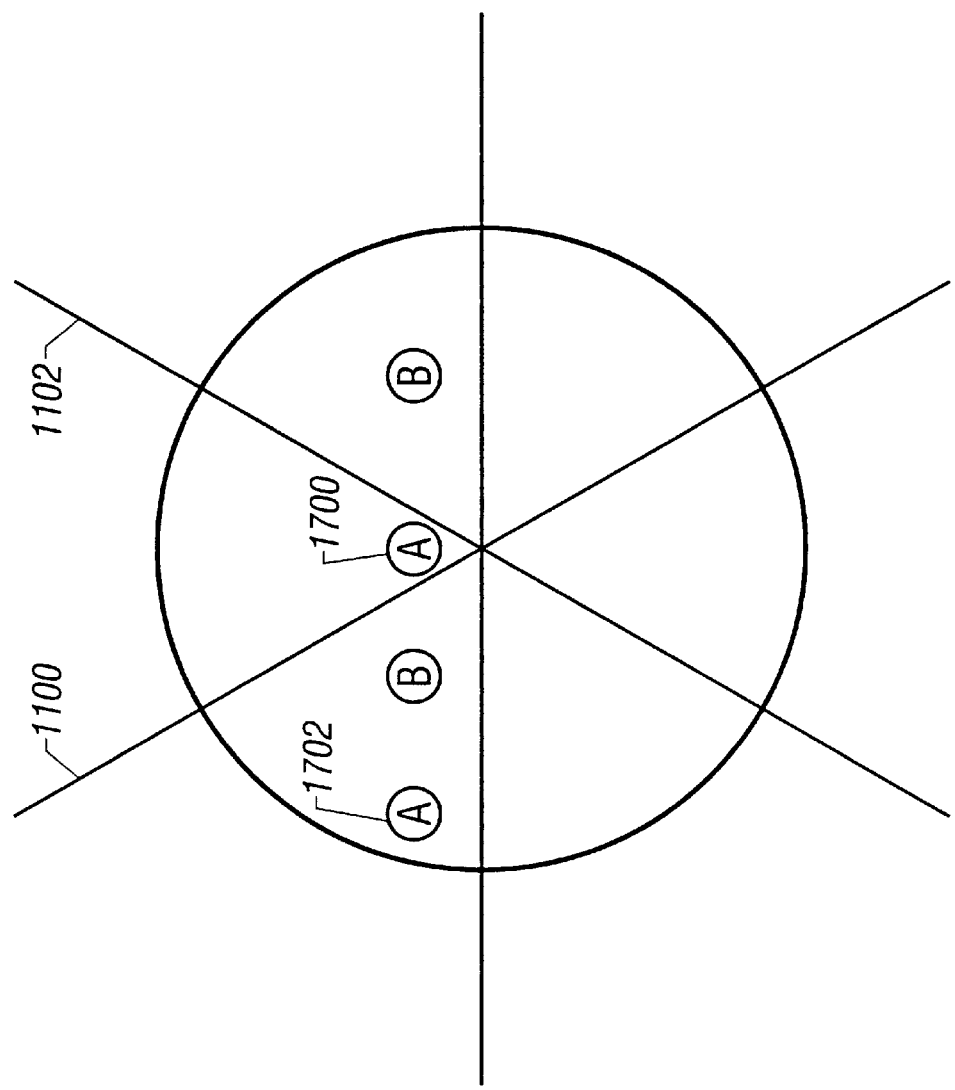
FIG. 17 shows a conceptual diagram of positioning of earth stations relative to the satellites.

The present inventors have devised a way to communicate with every satellite in every ring using only two TT&C stations. FIG. 17 shows TT&C stations 1700 and 1702. These stations are at position A at 12:00; and station 1700 communicates with all satellites. At 3:00 PM, the earth station locations are shown as B. At this time, station 1700 communicates with satellite ring 1102, and station 1702 communicates with satellite ring 1100.

FIG. 17B shows the positions at 6:00 (position C), and positions at 9:00 (position D). The positions at 12:00 are again position A, shown in FIG. 17.

The situation continues throughout the entire earth rotation, as the TT&C stations pass in and out of various satellite orbits.

The inventors of the present invention have found that by locating TT&C stations at 25°–35° north latitude, and separated by 90° of longitude, that two TT&C stations can service the entire Concordia/Borealis constellation. This means that two TT&C ground stations can be used to service all satellites in the system, including those in inclined planes and those in the equatorial plane.

Preferably, the present inventors postulate locating one of the TT&C stations in the U.S., and the other off of northern Spain.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method of interfacing with orbiting satellites, which requires communicating with each of a plurality of satellites in a plurality of orbiting rings at least once during each rotation, comprising:

locating a plurality of satellites which orbit the earth in two elliptical rings having opposite inclinations to one another;

establishing telemetry stations for said plurality of satellites at two locations on the earth with a 90° separation in longitude therebetween; and using said two stations, and no others, to view each of the satellites in said rings at least once during each satellite rotation.

2. A method as in claim 1 wherein said earth stations are located between around 25° and 40° north latitude.

3. A method as in claim 1 comprising the further step of orbiting a plurality of low earth orbit circular or slightly elliptical satellites in an equatorial orbit, and communicating with said circular satellites using said same two stations.

4. A satellite communications system comprising:

a constellation of satellites orbiting the earth including two rings of oppositely-inclined elliptical satellites each having a plurality of satellites therein, and a ring of circular equatorial low earth orbit satellites;

two and only two tracking telemetry and control stations, located on the earth, and communicating with said satellites, said two stations separated in longitude by 90°, and communicating with said satellites such that each satellite in all of said orbits communicates with at least one of said stations once during each of its rotation periods.

5. An apparatus as in claim 4 wherein said elliptical satellites have an inclination with an absolute value of around 116°, an eccentricity of about 0.35, and a semi-major axis of about 10,000 kilometers.

6. An apparatus as in claim 5 wherein said circular orbits have a height above the earth of 7800 kilometers.

7. An apparatus as in claim 5, wherein at least some of said satellites have apogees which always point in a constant direction relative to the sun.

* * * * *